(12) United States Patent
Tang

(10) Patent No.: US 11,147,085 B2
(45) Date of Patent: Oct. 12, 2021

(54) METHOD FOR DEVICE-TO-DEVICE COMMUNICATION, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 48 days.

(21) Appl. No.: 16/726,421

(22) Filed: Dec. 24, 2019

(65) Prior Publication Data

US 2020/0137773 A1 Apr. 30, 2020

Related U.S. Application Data

(63) Continuation of application No. PCT/CN2017/095949, filed on Aug. 4, 2017.

(51) Int. Cl.
*H04W 72/12* (2009.01)
*H04L 5/00* (2006.01)
(Continued)

(52) U.S. Cl.
CPC ....... *H04W 72/1205* (2013.01); *H04L 5/0053* (2013.01); *H04L 5/0094* (2013.01);
(Continued)

(58) Field of Classification Search
CPC ......... H04W 72/0453; H04W 72/0446; H04W 72/02; H04W 76/14
See application file for complete search history.

(56) References Cited

U.S. PATENT DOCUMENTS

2015/0327315 A1 11/2015 Xue et al.
2016/0095024 A1 3/2016 Chae et al.
(Continued)

FOREIGN PATENT DOCUMENTS

CN 105025676 A 11/2015
CN 105338467 a 2/2016
(Continued)

OTHER PUBLICATIONS

The EESR of corresponding European application No. 17919958.3, dated Apr. 9, 2020.
(Continued)

*Primary Examiner* — Raj Jain
(74) *Attorney, Agent, or Firm* — Ladas & Parry LLP

(57) ABSTRACT

The present application discloses a method for D2D communication, a terminal device, and a network device. The method includes: a first terminal device determining first control channel resources from pre-configured resources pool available for transmission of first resources scheduling information, and determining second control channel resources from the pre-configured resources pool available for transmission of second resources scheduling information, where the first control channel resources have a time domain length longer than that of the second control channel resources; and the first terminal device transmitting the first resources scheduling information on the first control channel resources, and transmitting the second resources scheduling information on the second control channel resources, where the first resources scheduling information and the second resources scheduling information are respectively used by a second terminal device and a third terminal device to determine data channel resources for the first terminal device.

16 Claims, 8 Drawing Sheets

(51) Int. Cl.
  *H04W 72/02* (2009.01)
  *H04W 72/04* (2009.01)
  *H04W 76/14* (2018.01)

(52) U.S. Cl.
  CPC ....... *H04W 72/02* (2013.01); *H04W 72/0406* (2013.01); *H04W 72/0446* (2013.01); *H04W 72/0453* (2013.01); *H04W 72/1289* (2013.01); *H04W 76/14* (2018.02)

(56) References Cited

U.S. PATENT DOCUMENTS

| | | | |
|---|---|---|---|
| 2017/0012753 A1* | 1/2017 | Kim | H04W 56/002 |
| 2017/0019778 A1 | 1/2017 | Jung et al. | |
| 2017/0027015 A1 | 1/2017 | Wijesinghe et al. | |
| 2017/0280403 A1* | 9/2017 | Kim | H04W 56/001 |
| 2017/0366328 A1* | 12/2017 | Seo | H04L 1/0009 |
| 2018/0376525 A1* | 12/2018 | Feng | H04L 27/0014 |
| 2019/0356371 A1* | 11/2019 | Osawa | H04W 88/02 |
| 2020/0022117 A1* | 1/2020 | Dong | H04W 72/0453 |
| 2020/0037298 A1* | 1/2020 | Shi | H04W 72/0406 |
| 2020/0137773 A1* | 4/2020 | Tang | H04W 72/02 |

FOREIGN PATENT DOCUMENTS

| | | |
|---|---|---|
| CN | 105451211 A | 3/2016 |
| CN | 105517159 A | 4/2016 |
| CN | 106559877 A | 4/2017 |
| CN | 106658716 A | 5/2017 |
| CN | 106664182 A | 5/2017 |
| CN | 106793090 A | 5/2017 |
| EP | 2334134 A2 | 6/2011 |
| EP | 3179811 A1 | 6/2017 |
| EP | 3352402 A1 | 7/2018 |
| RU | 2615164 C2 | 4/2017 |
| WO | 2016021227 A1 | 2/2016 |
| WO | 2017034296 A1 | 3/2017 |
| WO | 2017048109 A1 | 3/2017 |

OTHER PUBLICATIONS

The First Office Action of corresponding Chinese applicalkon No. 201700091886.7, dated Jun. 3, 2020.
Samsung. "Discussion on short TTI in V2X" R1-1707912, 第 3GPP TSG RAN WG1 #89 期, May 19, 2017.
Intel Corporation, "Considerations on Support of Short TTI for LTE V2V Sidelink Communication" R1-1704688, 第 3GPP TSG RAN WG1#88bis期, Apr. 7, 2017.
International Search Report (ISR) with an English translation dated Apr. 28, 2018 for Application No. PCT/CN2017/095949.
The first Office Action of corresponding Russian application No. 2020102421, dated Nov. 27, 2020.
The First Office Action of corresponding Indian application No. 201917054181, dated Feb. 16, 2021.
The first Office Action of corresponding Canadian application No. 3070888, dated Mar. 9. 2021.

* cited by examiner

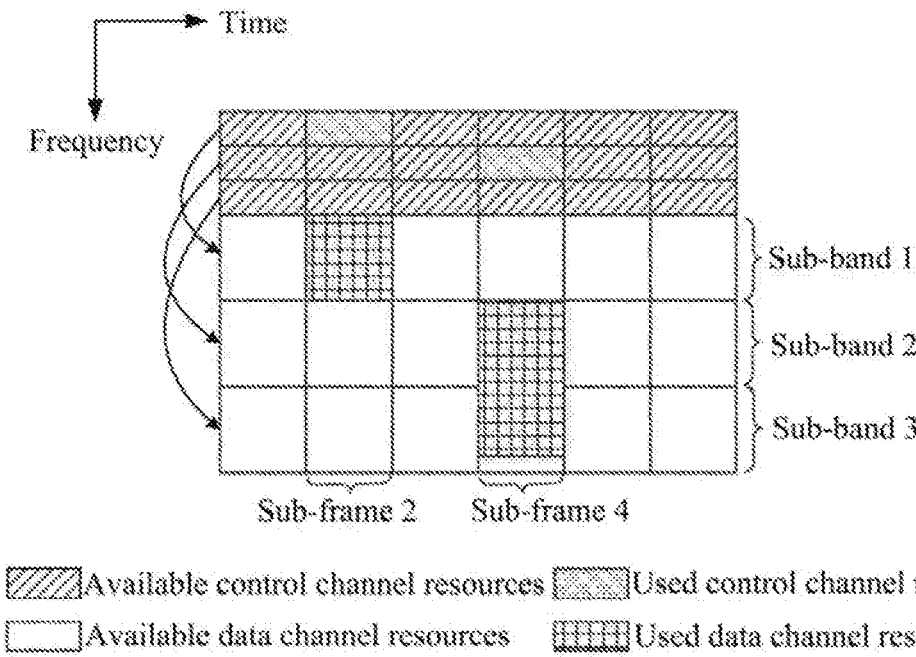

FIG. 3

A first terminal device determines first control channel resources from pre-configured resources pool available for transmission of first resources scheduling information, and determines second control channel resources from the pre-configured resources pool available for transmission of second resources scheduling information, where the first control channel resources have a time domain length longer that of the second control channel resources ~ 410

The first terminal device transmits the first resources scheduling information on the first control channel resources, and transmits the second resources scheduling information on the second control channel resources ~ 420

FIG. 4

METHOD FOR DEVICE-TO-DEVICE COMMUNICATION, TERMINAL DEVICE, AND NETWORK DEVICE

CROSS-REFERENCE TO RELATED APPLICATIONS

This application is a continuation of International Application No. PCT/CN2017/095949, filed on Aug. 4, 2017, the content of which is incorporated herein by reference in its entirety.

TECHNICAL FIELD

Embodiments of the present application relate to field of wireless communications and, in particular, to a method for device-to-device (D2D) communication, a terminal device, and a network device.

BACKGROUND

A Telematics or Vehicle to Everything (V2X) communication system is a Sidelink (SL) transmission technology based on D2D communication. Different from a traditional mode in a Long Term Evolution (LTE) system where data is received or transmitted by a base station, the Telematics system uses a terminal-to-terminal direct communication mode, and thus has higher spectrum efficiency and lower transmission time delay.

In the Telematics system, a terminal determines, according to control channel(s), data channel resources for transmission of data channel(s) so that data transmission is performed on the corresponding data channel resources. In Release-14 of the $3^{rd}$ Generation Partnership Project (3GPP) protocol, the control channel(s) is/are transmitted within a Transmission Time Interval (TTI), where one TTI corresponds to one sub-frame, i.e. 1 ms, in terms of time. However, for a terminal of a new release (Release-15), in order to reduce the time delay, control channel(s) and data channel(s) may be transmitted within a short TTI (sTTI), for example, one sTTI corresponds to one time slot, i.e. 0.5 ms, in terms of time. In this way, when the terminal of Release-14 and the terminal of Release-15 jointly perform data transmission in resources pool, the terminal of Release-14 cannot detect the control channel(s) if the terminal of Release-15 transmits the control channel(s) in the sTTI, therefore, it is impossible to sense occupancy of resources for the terminal of Release-15, and thus interference therebetween is incurred.

Therefore, it is an urgent problem to be solved with regard to how to enable terminals supporting different communication protocols to jointly perform data transmission in a communication system and reduce interference therebetween.

SUMMARY

Embodiments of the present application provide a method for D2D communication, a terminal device and a network device, which enable terminals supporting different communication protocols to jointly perform data transmission in a communication system and reduce interference therebetween.

In a first aspect, a method for D2D communication is provided, including: determining, by a first terminal device, first control channel resources from pre-configured resources pool available for transmission of first resources scheduling information, and determining second control channel resources from pre-configured resources pool available for transmission of second resources scheduling information, where the first control channel resources have a time domain length longer that of the second control channel resources; and transmitting, by the first terminal device, the first resources scheduling information on the first control channel resources, and transmitting the second resources scheduling information on the second control channel resources.

Where the first resources scheduling information is used by a second terminal device to determine data channel resources available for the first terminal device to transmit data channel(s), and the second resources scheduling information is used by a third terminal device to determine the data channel resources; the second terminal device is capable of detecting resources scheduling information based on the time domain length of the first control channel resources, and the third terminal device is capable of detecting resources scheduling information based on the time domain length of the first control channel resources and/or the time domain length of the second control channel resources.

Therefore, a first terminal device transmits, in respective corresponding resources pools available for transmission of resources scheduling information of different lengths, two types of resources scheduling information having different lengths, so that a second terminal device and a third terminal device supporting different protocol releases can detect resources scheduling information for the first terminal device in the respective corresponding resources pools to obtain resources usage situation for the first terminal device, thereby jointly performing data transmission in a communication system and reducing interference.

In a possible implementation, the second control channel resources are located between the first control channel resources and the data channel resources in a frequency domain; or the data channel(s) is/are located between the first control channel resources and the second control channel resources in a frequency domain; or the first control channel resources are located between the second control channel resources and the data channel resources in a frequency domain.

In a possible implementation, the data channel resources are adjacent or non-adjacent to the first control channel resources in a frequency domain, the data channel resources are adjacent or non-adjacent to the second control channel resources in a frequency domain, and the first control channel resources are adjacent or non-adjacent to the second control channel resources in a frequency domain.

In a possible implementation, the method further includes: receiving, by the first terminal device, indication information transmitted by a network device, where the indication information is used to indicate a position of a start resources block (RB) in the resources pool available for transmission of the second resources scheduling information.

For example, for the second control channel resources transmitted on the sTTI as described above, a configuration parameter startRB-shortPSCCH-pool may be incorporated to indicate an index of a start RB of the resources pool available for transmission of the second resources scheduling information. A network device may configure and deliver the parameter(s) for a terminal device; the parameter(s) may also be predetermined by the network device and the terminal device, for example, specified in a protocol.

In a possible implementation, the resources pool available for transmission of the second resources scheduling information includes frequency domain resources of a preset size at an end of each of a plurality of sub-bands.

Where each of the plurality of sub-bands includes a plurality of consecutive physical resources blocks (PRB), and resources allocation for the entire system bandwidth is based on a sub-band granularity.

In a possible implementation, if frequency domain resources of the preset size at an end of a first sub-band in which the data channel resources are located are not occupied by the data channel(s), the second control channel resources occupy the frequency domain resources of the preset size at the end of the first sub-band; if the frequency domain resources of the preset size at the end of the first sub-band are at least partially occupied by the data channel(s), the second control channel resources occupy frequency domain resources of the preset size at an end of a second sub-band, where the second sub-band is a next sub-band which is adjacent to the first sub-band and not occupied by the data channel(s).

In a possible implementation, the resources pool available for transmission of the first resources scheduling information includes frequency domain resources of a preset size at a start of each of the sub-bands, where the first control channel resources are adjacent, in a frequency domain, to the data channel resources occupied by the data channel(s) corresponding to the first resources scheduling information carried on the first control channel resources.

In a possible implementation, the resources pool available for transmission of the second resources scheduling information is configured by network device or agreed in protocol, and the resources pool available for transmission of the first resources scheduling information is configured by network device or agreed in protocol.

In a possible implementation, the second control channel resources are aligned with a time domain start position of the data channel resources, and/or the second control channel resources are aligned with a time domain end position of the data channel resources.

In a possible implementation, the second terminal device supports a communication protocol of Release-14 and does not support a communication protocol of Release-15, while the first terminal device and the third terminal device support a communication protocol of Release-15.

In a second aspect, a method for D2D communication is provided, including: detecting, by a third terminal device, second resources scheduling information transmitted by a first terminal device from pre-configured resources pool available for transmission of the second resources scheduling information, where the second resources scheduling information occupies second control channel resources, and where the second control channel resources have a time domain length shorter than that of first control channel resources, and the first control channel resources are used by the first terminal device to transmit first resources scheduling information;

determining, by the third terminal device, according to the second resources scheduling information, data channel resources available for the first terminal device to transmit data channel(s);

where the first resources scheduling information is used by a second terminal device to determine the data channel resources; the second terminal device is capable of detecting resources scheduling information based on the time domain length of the first control channel resources, and the third terminal device is capable of detecting resources scheduling information based on the time domain length of the first control channel resources and/or the time domain length of the second control channel resources.

Therefore, a terminal device detects, based on a length of control channel resources that can be detected by itself, resources scheduling information transmitted by other terminal device, in a resources pool for transmission of the resources scheduling information of this length, to obtain resources usage situation for the other terminal device. Therefore, data transmission is performed jointly in a communication system and interference is avoided.

In a possible implementation, the second control channel resources are located between the first control channel resources and the data channel resources in a frequency domain; or the data channel(s) is/are located between the first control channel resources and the second control channel resources in a frequency domain; or the first control channel resources are located between the second control channel resources and the data channel resources in a frequency domain.

In a possible implementation, the data channel resources are adjacent or non-adjacent to the first control channel resources in a frequency domain, the data channel resources are adjacent or non-adjacent to the second control channel resources in a frequency domain, and the first control channel resources are adjacent or non-adjacent to the second control channel resources in a frequency domain.

In a possible implementation, the method further includes: receiving, by the third terminal device, indication information transmitted by a network device, where the indication information is used to indicate a position of a start resources block in the resources pool available for transmission of the second resources scheduling information.

In a possible implementation, the resources pool available for transmission of the second resources scheduling information includes frequency domain resources of a preset size at an end of each of a plurality of sub-bands.

In a possible implementation, if frequency domain resources of the preset size at an end of a first sub-band in which the data channel resources are located are not occupied by the data channel(s), the second control channel resources occupy the frequency domain resources of the preset size at the end of the first sub-band; if the frequency domain resources of the preset size at the end of the first sub-band are at least partially occupied by the data channel(s), the second control channel resources occupy frequency domain resources of the preset size at an end of a second sub-band, where the second sub-band is a next sub-band which is adjacent to the first sub-band and not occupied by the data channel(s).

In a possible implementation, the resources pool available for transmission of the first resources scheduling information includes frequency domain resources of a preset size at a start of each of the sub-bands, where the first control channel resources are adjacent to the data channel resources in a frequency domain.

In a possible implementation, the resources pool available for transmission of the second resources scheduling information is configured by network device or agreed in protocol, and the resources pool available for transmission of the first resources scheduling information is configured by network device or agreed in protocol.

In a possible implementation, the second control channel resources are aligned with a time domain start position of the data channel resources, and/or the second control channel resources are aligned with a time domain end position of the data channel resources.

In a possible implementation, the second terminal device supports a communication protocol of Release-14 and does not support a communication protocol of Release-15, while the first terminal device and the third terminal device support a communication protocol of Release-15.

In a third aspect, a method for D2D communication is provided, including: determining, by a network device, a resources pool available for transmission of first resources scheduling information and a resources pool available for transmission of second resources scheduling information, and transmitting, by the network device, indication information to a first terminal device, where the indication information is used to indicate the resources pool available for transmission of the first resources scheduling information and the resources pool available for transmission of the second resources scheduling information so that the first terminal device determines, from the resources pool available for transmission of the first resources scheduling information, first control channel resources for transmission of the first resources scheduling information, and determines, from the resources pool available for transmission of the second resources scheduling information, second control channel resources for transmission of the second resources scheduling information, where the first control channel resources have a time domain length longer than that of the second control channel resources:

where the first resources scheduling information is used by a second terminal device to determine data channel resources available for the first terminal device to transmit data channel(s), and the second resources scheduling information is used by a third terminal device to determine the data channel resources; the second terminal device is capable of detecting resources scheduling information based on the time domain length of the first control channel resources, and the third terminal device is capable of detecting resources scheduling information based on the time domain length of the first control channel resources and/or the time domain length of the second control channel resources.

Therefore, a network device pre-configures resources pools available for transmission of resources scheduling information of different lengths to enable a first terminal device to respectively transmit two types of resources scheduling information having different lengths in preset different resources pools, so that a second terminal device and a third terminal device supporting different protocol releases can detect resources scheduling information for the first terminal device in the respective corresponding resources pools to obtain resources usage situation for the first terminal device, thereby jointly performing data transmission in a communication system and reducing interference.

In a possible implementation, the second control channel resources are located between the first control channel resources and the data channel resources in a frequency domain; or the data channel(s) is/are located between the first control channel resources and the second control channel resources in a frequency domain; or the first control channel resources are located between the second control channel resources and the data channel resources in a frequency domain.

In a possible implementation, the data channel resources are adjacent or non-adjacent to the first control channel resources in a frequency domain, the data channel resources are adjacent or non-adjacent to the second control channel resources in a frequency domain, and the first control channel resources are adjacent or non-adjacent to the second control channel resources in a frequency domain.

In a possible implementation, the indication information includes information on a start resources block in the resources pool available for transmission of the second resources scheduling information, such as an index of the start resources block.

In a possible implementation, the resources pool available for transmission of the second resources scheduling information includes frequency domain resources of a preset size at an end of each of a plurality of sub-bands.

In a possible implementation, if frequency domain resources of the preset size at an end of a first sub-band in which the data channel resources are located are not occupied by the data channel(s), the second control channel resources occupy the frequency domain resources of the preset size at the end of the first sub-band; if the frequency domain resources of the preset size at the end of the first sub-band are at least partially occupied by the data channel(s), the second control channel resources occupy frequency domain resources of the preset size at an end of a second sub-band, where the second sub-band is a next sub-band which is adjacent to the first sub-band and not occupied by the data channel(s).

In a possible implementation, the resources pool available for transmission of the first resources scheduling information includes frequency domain resources of a preset size at a start of each of the sub-bands, where the first control channel resources are adjacent to the data channel resources in a frequency domain.

In a possible implementation, the resources pool available for transmission of the second resources scheduling information is configured by network device or agreed in protocol, and the resources pool available for transmission of the first resources scheduling information is configured by network device or agreed in protocol.

In a possible implementation, the second control channel resources are aligned with a time domain start position of the data channel resources, and/or the second control channel resources are aligned with a time domain end position of the data channel resources.

In a possible implementation, the second terminal device supports a communication protocol of Release-14 and does not support a communication protocol of Release-15, while the first terminal device and the third terminal device support a communication protocol of Release-15.

In a fourth aspect, a terminal device is provided. The terminal device may perform an operation of the first terminal device in the first aspect or any optional implementation of the first aspect described above. In particular, the terminal device may include a modular unit for performing an operation of the terminal device in the first aspect or any possible implementation of the first aspect described above.

In a fifth aspect, a terminal device is provided. The terminal device may perform an operation of the third terminal device in the second aspect or any optional implementation of the second aspect described above. In particular, the terminal device may include a modular unit for performing an operation of the terminal device in the second aspect or any possible implementation of the second aspect described above.

In a sixth aspect, a network device is provided. The network device may perform an operation of the network device in the third aspect or any optional implementation of the third aspect described above. In particular, the network device may include a modular unit for performing an operation of the network device in the third aspect or any possible implementation of the third aspect described above.

In a seventh aspect, a terminal device is provided. The terminal device includes: a processor, a transceiver, and a memory. Where the processor, the transceiver, and the memory communicate with each other via an internal connection path. The memory is configured to store an instruction, and the processor is configured to execute the instruction stored in the memory. When the processor executes the instruction stored in the memory, such execution causes the terminal device to perform the method in the first aspect or any possible implementation of the first aspect, or such execution causes the terminal device to implement the first terminal device provided in the fourth aspect.

In an eighth aspect, a terminal device is provided. The terminal device includes: a processor, a transceiver, and a memory. Where the processor, the transceiver, and the memory communicate with each other via an internal connection path. The memory is configured to store an instruction, and the processor is configured to execute the instruction stored in the memory. When the processor executes the instruction stored in the memory, such execution causes the terminal device to perform the method in the second aspect or any possible implementation of the second aspect, or such execution causes the terminal device to implement the third terminal device provided in the fifth aspect.

In a ninth aspect, a network device is provided. The network device includes: a processor, a transceiver, and a memory. Where the processor, the transceiver, and the memory communicate with each other via an internal connection path. The memory is configured to store an instruction, and the processor is configured to execute the instruction stored in the memory. When the processor executes the instruction stored in the memory, such execution causes the network device to perform the method in the third aspect or any possible implementation of the third aspect, or such execution causes the network device to implement the network device provided in the sixth aspect.

In a tenth aspect, a computer readable storage medium is provided. The computer readable storage medium is stored with a program which causes a terminal device to perform any method for D2D communication in the first aspect and various implementations of the first aspect described above.

In an eleventh aspect, a computer readable storage medium is provided. The computer readable storage medium is stored with a program which causes a network device to perform any method for D2D communication in the second aspect and various implementations of the second aspect described above.

In a twelfth aspect, a computer readable storage medium is provided. The computer readable storage medium is stored with a program which causes a network device to perform any method for D2D communication in the third aspect and various implementations of the third aspect described above.

In a thirteenth aspect, a system chip is provided. The system chip includes an input interface, an output interface, a processor, and a memory, where the processor is configured to execute an instruction stored in the memory, and when the instruction is executed, the processor may implement the method in the first aspect or any possible implementation of the first aspect described above.

In a fourteenth aspect, a system chip is provided. The system chip includes an input interface, an output interface, a processor, and a memory, where the processor is configured to execute an instruction stored in the memory, and when the instruction is executed, the processor may implement the method in the second aspect or any possible implementation of the second aspect described above.

In a fifteenth aspect, a system chip is provided. The system chip includes an input interface, an output interface, a processor, and a memory, where the processor is configured to execute an instruction stored in the memory, and when the instruction is executed, the processor may implement the method in the third aspect or any possible implementation of the third aspect described above.

In a sixteenth aspect, a computer program product including an instruction is provided. When the computer program product operates on a computer, causing the computer to perform the method in the first aspect or any possible implementation of the first aspect described above.

In a seventeenth aspect, a computer program product including an instruction is provided. When the computer program product operates on a computer, causing the computer to perform the method in the second aspect or any possible implementation of the second aspect described above.

In an eighteenth aspect, a computer program product including an instruction is provided. When the computer program product operates on a computer, causing the computer to perform the method in the third aspect or any possible implementation of the third aspect described above.

BRIEF DESCRIPTION OF DRAWING(S)

FIG. 3 is a schematic diagram of resources illustrating that control channel resources are non-adjacent to data channel resources in a frequency domain.

FIG. 4 is a schematic flowchart illustrating a method for D2D communication according to an embodiment of the present application.

DESCRIPTION OF EMBODIMENTS

Technical solutions in the embodiments of the present application will be described hereunder with reference to the accompanying drawings.

Figure 1:
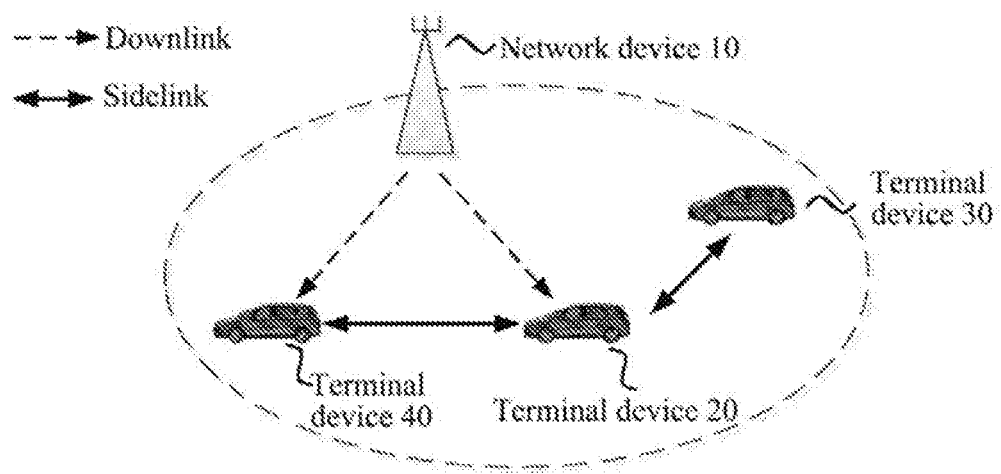
FIG. 1 is a schematic architecture diagram illustrating an application scenario according to an embodiment of the present application.

FIG. 1 is a schematic diagram illustrating a wireless communication system applied in an embodiment of the present application. The wireless communication system may include at least one network device 10. The network device 10 may be a device that communicates with a terminal device. Each network device 10 may provide a particular geographic area with communication coverage and may communicate with a terminal device (e.g., UE) located within the coverage. The network device 10 may be a base station (Base Transceiver Station, BTS) in a Global System of Mobile communication (GSM) system or a Code Division Multiple Access (CDMA) system, or a base station (NodeB, NB) in a Wideband Code Division Multiple Access (WCDMA) system, or an evolved base station (Evolutional Node B, eNB or eNodeB) in a Long Term Evolution (LTE) system, or a wireless controller in a Cloud Radio Access Network (CRAN), or the network device may be a relay station, an access point, a vehicle-mounted device, a wearable device, a network side device in a future 5G network or a network device in a future evolutional Public Land Mobile Network (PLMN), or the like.

The wireless communication system also includes a plurality of terminal devices located within the coverage of the network device 10, such as the terminal device 20, the terminal device 30, and the terminal device 40. These terminal devices may be movable or stationary. These terminal devices may refer to access terminals, User Equipment (UE), subscriber units, subscriber stations, mobile stations, mobile platforms, remote stations, remote terminals, mobile devices, user terminals, terminals, wireless communication devices, user agents, or user devices. The access terminals may be cellular phones, cordless phones, Session Initiation Protocol (SIP) phones, Wireless Local Loop (WLL) stations, Personal Digital Assistants (PDA), handheld devices with wireless communication functions, computing devices or other processing devices connected to wireless modems, vehicle-mounted devices, wearable devices, terminal devices in the future 5G network, or terminal devices in a future evolutional Public Land Mobile Network (PLMN), or the like.

FIG. 1 is a schematic diagram illustrating an application scenario according to an embodiment of the present application. FIG. 1 exemplarily shows one network device and three terminal devices. In an embodiment, the wireless communication system may include a plurality of network devices and other numbers of terminal devices may be included within the coverage of each of the network devices, which is not limited in the embodiments of the present application. In addition, the wireless communication system may further include a Mobile Management Entity (MME), a Serving Gateway (S-GW), a Packet Data Network Gateway (P-GW) and other network entities, but the embodiments of the present invention are not limited thereto.

Specifically, the terminal device 20, the terminal device 30, and the terminal device 40 may communicate with each other in a cellular communication mode or a D2D communication mode, where in the cellular communication mode, a terminal device communicates with other terminal device via a cellular link with the network device; in the D2D communication mode, two terminal devices directly communicate with each other via a D2D link, i.e. a Sidelink (SL).

The D2D communication may refer to Vehicle to Vehicle (V2V) communication or Vehicle to Everything (V2X) communication. In the V2X communication, X may refer to any device with a wireless receiving and transmitting capabilities, for example, but not limited to a wireless device that moves slowly, a vehicle-mounted device that moves quickly, or a network control node with wireless transmitting and receiving capabilities, or the like. It should be understood that the embodiments of the present invention are mainly applied to a V2X communication scenario, but can also be applied to any other D2D communication scenario, which is not limited in the embodiments of the present invention.

In a Telematics system, the terminal device 20 may transmit control information such as resources scheduling information to indicate a position of data channel resources for the terminal device 20, and the resources scheduling information may be known as Scheduling Assignment (SA) information, for example. The resources scheduling information indicates data channel resources used by the terminal device 20 for data transmission, so that the terminal device 30 can determine the position of the data channel resources for the terminal device 20 after it detects the resources scheduling information, thereby performing data reception, and resources sensing and selecting. The resources scheduling information carries information related to data transmission of the terminal device 20, such as a Modulation Coding Mode (MCS), time-frequency resources allocation information, resources reservation information, or the like. The terminal device 30 that receives the resources scheduling information may obtain a position of a time-frequency resources used by the terminal device 20 for data transmission, and resources reservation information, or the like, by detecting the resources scheduling information, so that resources usage situation for the terminal device 20 is determined. If the terminal device 30 cannot successfully detect the resources scheduling information, energy on all transmission resources may be measured and all the transmission resources are sorted according to the energy level, with a preferential selection of low-energy transmission resources for its own data transmission.

In Release-14 of the 3$^{rd}$ Generation Partnership Project (3GPP) protocol, data transmission and corresponding resources scheduling information transmission are performed in a Frequency Division Multiplexing (FDM) mode. Specifically, a resources pool for transmission of resources scheduling information and a resources pool for transmission of data have two configurations, that is, an adjacent mode and a non-adjacent mode in a frequency domain.

Figure 2:
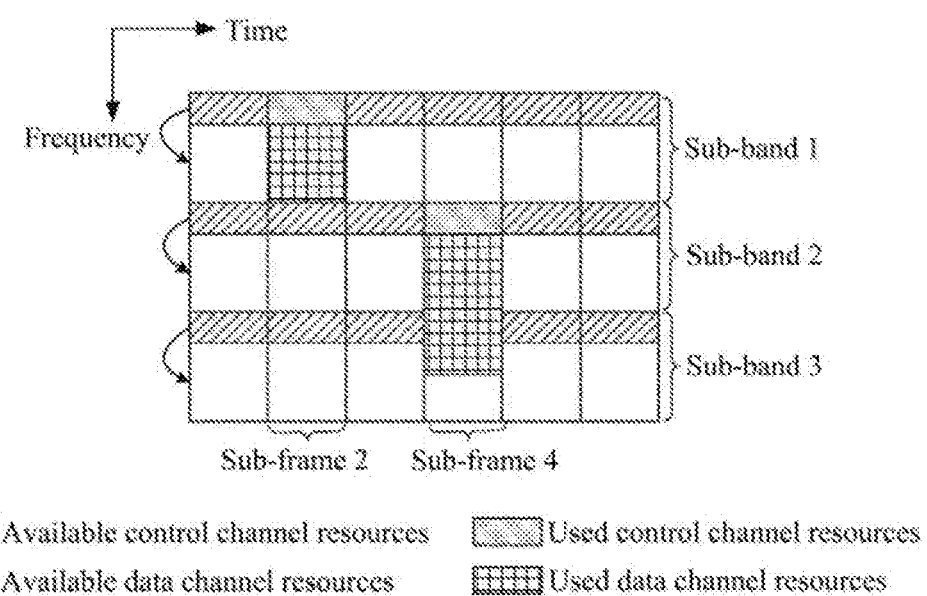
FIG. 2 is a schematic diagram of resources illustrating that control channel resources are adjacent to data channel resources in a frequency domain.

For example, for an adjacent situation in a frequency domain shown in FIG. 2, control channel resources for transmission of resources scheduling information is adjacent, in a frequency domain, to data channel resources for transmission of data channel(s), the entire system bandwidth is based on a sub-band (also referred to as subband) granularity, and each sub-band includes a plurality of consecutive physical resources blocks (PRB), where a first PRB and a second PRB in each sub-band can be used to transmit the resources scheduling information (that is, the control channel resources occupy two adjacent PRBs in the sub-band in the frequency domain), while a remaining PRB is an available data channel resources, and the data channel resources and the control channel resources have an one-to-one correspondence, moreover, a start position of the data channel resources are determined by a position of the corresponding control channel resources. The data channel resources may occupy one sub-band (for example, the data channel resources used by the terminal device as shown on sub-frame 2 occupy sub-band 1), or may span a plurality of sub-bands (for example, the data channel resources used by the terminal device as shown on sub-frame 4 occupy sub-band 2 and sub-band 3). When the data channel resources occupy a plurality of sub-bands, the data channel resources are consecutive in the frequency domain within the plurality of sub-bands, and may occupy control channel resources in other sub-bands; in addition, the control channel resources corresponding to the data channel resources are located in control channel resources in a first sub-band where the data channel resources are located, for example, the data channel resources as shown on sub-frame 4 in FIG. 2 occupy two adjacent sub-bands (sub-band 2 and sub-band 3), and the corresponding control channel resources are located within control channel resources in a first sub-band (sub-band 2) of the two sub-bands.

For example, for a non-adjacent situation in a frequency domain shown in FIG. 3, control channel resources are non-adjacent, in a frequency domain, to a corresponding data channel resources, and the data channel resources and the control channel resources are independently configured. However, a position of the data channel resources and a position of the control channel resources have an one-to-one correspondence, and a start position of the data channel resources may be determined by the position of the corresponding control channel resources. The data channel resources may occupy one sub-band (for example, the data channel resources used by the terminal device as shown on sub-frame 2 occupy sub-band 1), or may occupy a plurality of sub-bands (for example, the data channel resources used by the terminal device as shown on sub-frame 4 occupy sub-band 2 and sub-band 3). When the data channel resources occupy a plurality of sub-bands, the data channel(s) is/are consecutive in the frequency domain within the plurality of sub-bands, and resources scheduling information corresponding to the data channel(s) is/are located in control channel resources in a first sub-band; for example, the data channel(s) shown on sub-frame 4 of FIG. 3 occupy/ occupies two adjacent sub-bands (sub-band 2 and sub-band 3), and resources scheduling information corresponding to the data channel(s) is/are located within control channel resources corresponding to a first sub-band (sub-band 2).

In Release-15 (Rel-15) of the 3GPP protocol, a short TTI (sTTI) is incorporated, and a terminal device supporting Release-IS is required to use an sTTI to transmit data channel(s), moreover, the terminal device supporting Release-15 and a terminal device supporting Release-14 (Rel-14) may perform data transmission in a common resources pool, which has a great influence on resources sensing and selecting processes for the terminal device supporting Release-14. Therefore, it is required that the terminal device of Release-14 can detect a control channel(s) transmitted by the terminal device of Release-15, such as resources scheduling information or Scheduling Assignment (SA) information, to learn resources occupancy situation for the terminal device of Release-15, so that resources sensing and selecting are performed. This requires the terminal device of Release-15 to be able to transmit normal control channel(s) compatible with Release-14. However, for the terminal device of the new release Release-15, in order to reduce the time delay, the control channel(s) and the data channel(s) can also be transmitted within one sTTI, that is, the terminal device of Release-15 can transmit short control channel(s) within the sTTI, for example, short scheduling assignment (short SA, sSA) information is transmitted on the sTTI. The terminal device of Release-15 may obtain content of the control channel(s) by detecting the sSA, and determine the data channel resources according to the control channel(s) and perform detection of the data channel(s), while it is not necessary to wait until 1 ms of TTI (that is, a normal TTI) is over to complete the detection of the control channel(s), thereby reducing the time delay.

That is to say, on one hand, in order to obtain resources occupancy situation for the terminal device of Release-IS, the terminal device of Release-14 needs to detect the control channel(s) transmitted by the terminal device of Release-15 so that resources sensing and selecting are performed. On the other hand, in order to obtain resources occupancy situation for the terminal device of Release-15, the terminal device of Release-15 also needs to detect the control channel(s) transmitted by the terminal device of Release-15 so that resources sensing and selecting are performed. However, the terminal device of Release-15 can detect short resources scheduling information transmitted on an sTTI, while the terminal device of Release-14 can only detect normal resources scheduling information transmitted on a TTI. In this way, terminals supporting different communication protocols cannot jointly perform data transmission in a communication system.

Therefore, according to the method for D2D communication in the embodiment of the present application, a first terminal device transmits, in respective corresponding resources pools available for transmission of resources scheduling information of different lengths, two types of resources scheduling information having different lengths, so that a second terminal device and a third terminal device supporting different protocol releases can detect resources scheduling information for the first terminal device in the respective corresponding resources pools to obtain resources usage situation for the first terminal device, thereby jointly performing data transmission in a communication system and reducing interference.

It should be understood that, in the embodiment of the present application, the terminal device performing transmission of control channel(s) or data channel(s) on different resources may include the terminal device receiving control channel(s) or data channel(s), and/or transmitting control channel(s) or data channel(s).

FIG. 4 is a schematic flowchart illustrating a method for D2D communication according to an embodiment of the present application. The method shown in FIG. 4 may be performed by a first terminal device which can be, for example, the terminal device 20 shown in FIG. 1. As shown in FIG. 4, the method for D2D communication includes:

In 410, a first terminal device determines first control channel resources from pre-configured resources pool available for transmission of first resources scheduling information, and determines second control channel resources from pre-configured resources pool available for transmission of second resources scheduling information, where the first control channel resources have a time domain length longer that of the second control channel resources.

In 420, the first terminal device transmits the first resources scheduling information on the first control channel resources, and transmits the second resources scheduling information on the second control channel resources.

Where the first resources scheduling information is used by a second terminal device to determine data channel resources available for the first terminal device to transmit data channel(s), and the second resources scheduling information is used by a third terminal device to determine the data channel resources the second terminal device is capable of detecting resources scheduling information based on the time domain length of the first control channel resources, and the third terminal device is capable of detecting resources scheduling information based on the time domain length of the first control channel resources and/or the time domain length of the second control channel resources.

Where the first terminal device is, for example, a vehicle terminal (Vehicle User Equipment, VUE) or a pedestrian handheld terminal (Pedestrian User Equipment, PUE); the second terminal device is, for example, a vehicle terminal or a handheld terminal; and the third terminal device is, for example, a vehicle terminal or a handheld terminal.

Where the resources scheduling information may also be known as Scheduling Assignment (SA) information.

Specifically, since terminal devices supporting different releases of communication protocols can detect control channels of different lengths, in order to enable other terminal devices supporting different releases of communication protocols to detect content of the resources scheduling information transmitted by the first terminal device, the first terminal device needs to separately transmit, in different resources pools, two resources scheduling information having different time domain lengths, that is, the first resources scheduling information and the second resources scheduling information. The first terminal device determines first control channel resources from pre-configured resources pool available for transmission of first resources scheduling information, and transmits the first resources scheduling information on the first control channel resources, meanwhile the first terminal device further determines second control channel resources from pre-configured resources pool available for transmission of second resources scheduling information, and transmits the second resources scheduling information on the second control channel resources. Where the first control channel resources have a time domain length longer than that of the second control channel resources, the first resources scheduling information transmitted on the first control channel resources are used by the second terminal device to determine data channel resources for the first terminal device, and the resources scheduling information transmitted on the second control channel resources are used by the third terminal device to determine data channel resources for the first terminal device.

Since the second terminal device can only detect resources scheduling information based on the time domain length of the first control channel resources (e.g., one sTTI) while the third terminal device can detect resources scheduling information based on the time domain length of the first control channel resources (e.g., one TTI) and the time domain length of the second control channel resources (e.g., one sTTI), therefore, the first terminal device simultaneously transmits two resources scheduling information so that the second terminal device and the third terminal device can respectively detect the first resources scheduling information and the second resources scheduling information for the first terminal device, thereby acquiring data channel resources for the first terminal device, and performing resources sensing and selecting to avoid data interference.

Since the first resources scheduling information is transmitted on the first control channel resources and the second resources scheduling information is transmitted on the second control channel resources, moreover, the first control channel resources are a preconfigured transmission resources from a resources pool available for transmission of the first resources scheduling information and the second control channel resources are also pre-configured transmission resources from a resources pool available for transmission of the second resources scheduling information, therefore, the second terminal device and the third terminal device can effectively detect respective required resources scheduling information from the corresponding resources pools, and perform corresponding operations.

In an embodiment, in 410, the resources pool available for transmission of the second resources scheduling information is configured by network device or agreed in protocol, and the resources pool available for transmission of the first resources scheduling information is configured by network device or agreed in protocol.

In an embodiment, the second terminal device supports a communication protocol of Release-14 and does not support a communication protocol of Release-15, while the first terminal device and the third terminal device support a communication protocol of Release-15 or other releases of communication protocols subsequent to Release-15.

It should be understood that, in the embodiment of the present application, the terminal device that supports the communication protocol of Release-14 and does not support the communication protocol of Release-15 is simply referred to as a terminal device of Release-14, and the terminal device that supports the communication protocol of Release-15 is simply referred to as a terminal device of Release-15. Where the terminal device of Release-15 may include a terminal device supporting Release-15 or a terminal device supporting other release of Release-15, for example, a terminal device of Release-16 that supports Release-15.

For example, the terminal device of Release-14, such as the terminal device 30 shown in FIG. 1, needs to detect resources scheduling information transmitted by the terminal device of Release-15, such as the terminal device 20, to obtain resources occupancy situation for the terminal device 20. The terminal device of Release-15, such as the terminal device 40 shown in FIG. 1, also needs to detect resources scheduling information transmitted by the terminal device 20 to obtain resources occupancy situation for the terminal device 20. However, the terminal device 40 can detect resources scheduling information transmitted on an sTTI, while the terminal device 30 can only detect resources scheduling information transmitted on a TTI. That is, the resources scheduling information detected by the terminal device 30 and the terminal device 40 has different time domain lengths.

Therefore, the terminal device 20 respectively transmits the first resources scheduling information and the second resources scheduling information, and the first control channel resources for transmission of the first resources scheduling information has a time domain length that is longer than that of the second control channel resources for transmission of the second resources scheduling information, so that the terminal device 30 may detect the first resources scheduling information on the first control channel resources and determine data channel resources for the terminal device 20 according to the first resources scheduling information, moreover, the terminal device 40 may also detect the second resources scheduling information on the second control channel resources and determine data channel resources for the terminal device 20 according to the second resources scheduling information.

For example, a position of the first control channel resources used by the terminal device 20 to transmit the first resources scheduling information has a corresponding relationship with a position of the data channel resources for the terminal device 20, the terminal device 30 may determine a frequency domain start position of the data channel resources for the terminal device 20 according to the position of the first control channel resources, and obtain, from the first resources scheduling information, a frequency domain width occupied by the data channel resources. Similarly, a position of the second control channel resources used by the terminal device 20 to transmit the second resources scheduling information also has a corresponding relationship with a position of the data channel resources, the terminal device 40 may determine a frequency domain start position of the data channel resources for the terminal device 20 according to the position of the second control channel resources, and obtain, from the second resources scheduling information, a frequency domain width occupied by the data channel resources.

The embodiment of the present application provides two resources allocation modes for the first terminal device to separately transmit the first scheduling information and the second resources scheduling information. Details will be described hereunder with reference to FIG. 5 to FIG. 8.

Mode 1

In an embodiment, the second control channel resources are located between the first control channel resources and the data channel resources in a frequency domain; or the data channel(s) is/are located between the first control channel resources and the second control channel resources in a frequency domain; or the first control channel resources are located between the second control channel resources and the data channel resources in a frequency domain.

In an embodiment, the data channel resources are adjacent or non-adjacent to the first control channel resources in a frequency domain, the data channel resources are adjacent or non-adjacent to the second control channel resources in a frequency domain, and the first control channel resources are adjacent or non-adjacent to the second control channel resources in a frequency domain.

Figure 5:
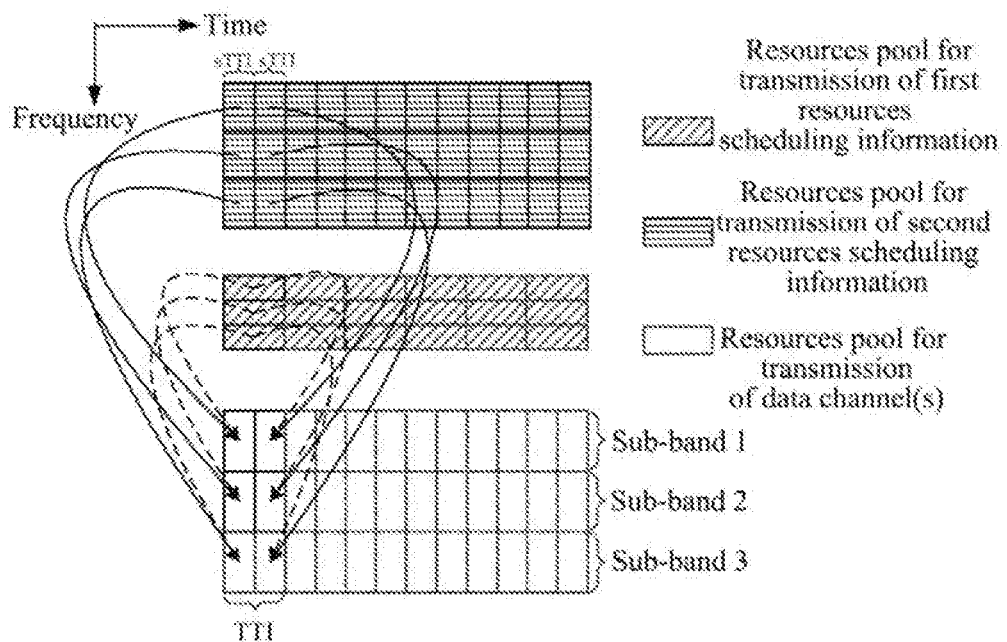
FIG. 5 is a schematic diagram illustrating a resources allocation according to an embodiment of the present application.

For example, FIG. 5 shows a resources diagram according to an embodiment of the present application, in which it is assumed that an sTTI occupies one time slot. The pre-configured resources pool available for transmission of the first resources scheduling information is located between the pre-configured resources pool available for transmission of the second resources scheduling information and data channel resources pool for transmission of data channel(s), and in the resources pool for transmission of the first resources scheduling information, data channels scheduled by resources scheduling information occupying different frequency domain resources have different frequency domain start positions in the data channel resources pool. Similarly, in the resources pool for transmission of the second resources scheduling information, data channels scheduled by resources scheduling information occupying different frequency domain resources have different frequency domain start positions in the data channel resources pool.

Each TTI shown in FIG. 5 includes two sTTIs, where the number of sub-bands within each sTTI available for transmission of a data channel(s) is equal to the number of resources within the sTTI available for transmission of second resources scheduling information, and the plurality of resources within the sTTI available for transmission of the second resources scheduling information have an one-to-one correspondence with the plurality of sub-bands available for transmission of the data channel(s). Similarly, within the TTI corresponding to the sTTI, the number of resources available for transmission of first resources scheduling information is equal to the number of the plurality sub-bands within each sTTI available for transmission of the data channel(s). Moreover, for a certain TTI, data channel resources within the TTI in the same sub-band and occupying different sTTIs correspond to the same resources within the TTI for transmission of the first resources scheduling information.

As shown in FIG. 5, with each sTTI, a resources pool available for transmission of data channel(s) includes three sub-bands, the number of resources available for transmission of second resources scheduling information is also three, and the number of resources within each TTI corresponding to the sTTI available for transmission of first resources scheduling information is also three. Moreover, within each sTTI, the plurality of sub-bands for transmission of the data channel(s) have an one-to-one correspondence with the plurality of resources within the sTTI for transmission of the second resources scheduling information; within each TTI, two data channel resources in the same sub-band and occupying different sTTIs correspond to the same resources within the TTI for transmission of the first resources scheduling information.

A first terminal device determines first control channel resources from a resources pool for transmission of first resources scheduling information, and transmits the first resources scheduling information on the first control channel resources.

A second terminal device may detect the first resources scheduling information in the pre-configured resources pool for transmission of the first resources scheduling information, which thus determines, according to a position of the first control channel resources on which the first resources scheduling information is detected, a position of data channel resources of data channel(s) scheduled by the second terminal device, and obtains a frequency domain size of the data channel resources and other information from the first resources scheduling information.

A third terminal device may detect the second resources scheduling information in the pre-configured resources pool for transmission of the second resources scheduling information, which thus determines, according to a position of the second control channel resources on which the second resources scheduling information is detected, a position of data channel resources of data channel(s) scheduled by the third terminal device, and obtains a frequency domain size of the data channel resources and other information from the second resources scheduling information.

Figure 6:
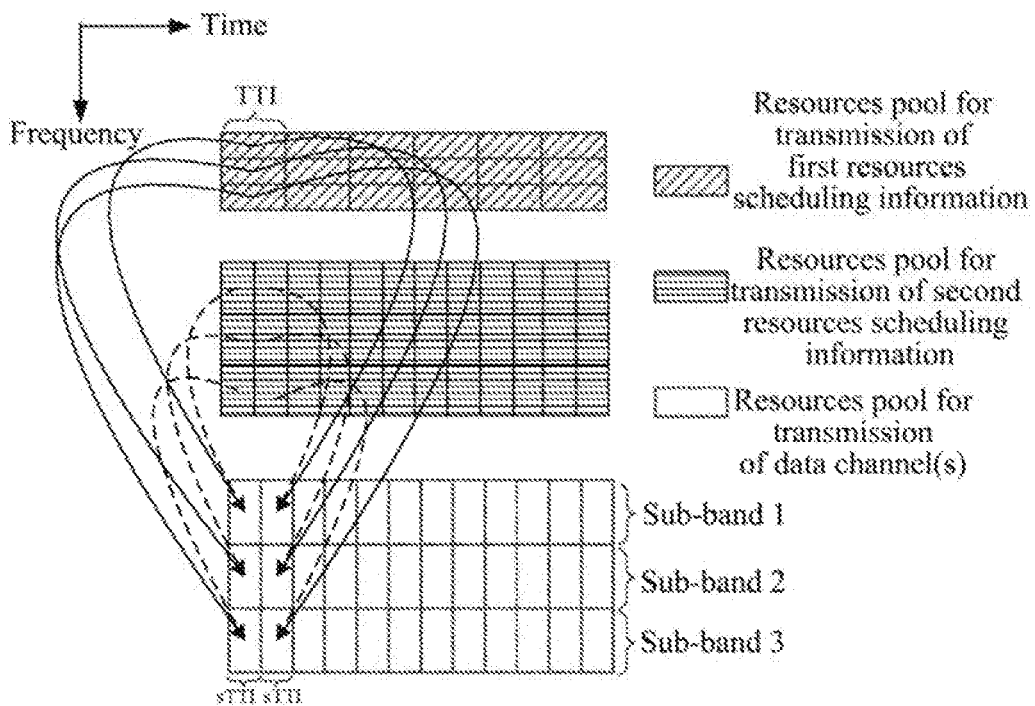
FIG. 6 is a schematic diagram illustrating another resources allocation according to an embodiment of the present application.

For another example, FIG. 6 shows another resources diagram, in which it is still assumed that an sTTI occupies one time slot. Different from what in FIG. 5, the pre-configured resources pool available for transmission of the second resources scheduling information is located between the pre-configured resources pool available for transmission of the first resources scheduling information and data channel resources pool for transmission of data channel(s), and in the resources pool for transmission of the first resources scheduling information, data channels scheduled by resources scheduling information occupying different frequency domain resources have different frequency domain start positions in the data channel resources pool. Similarly, in the resources pool for transmission of the second resources scheduling information, data channels scheduled by resources scheduling information occupying different frequency domain resources have different frequency domain start positions in the data channel resources pool.

Each TTI shown in FIG. 6 includes two sTTIs, where the number of sub-bands within each sTTI available for transmission of a data channel(s) is equal to the number of resources within the sTTI available for transmission of second resources scheduling information, and the plurality of resources within the sTTI available for transmission of the second resources scheduling information have an one-to-one correspondence with the plurality of sub-bands available for transmission of the data channel(s). Similarly, within the TTI corresponding to the sTTI, the number of resources available for transmission of first resources scheduling information is equal to the number of the plurality of sub-bands within each sTTI available for transmission of the data channel(s). Moreover, for a certain TTI, data channel resources within the TTI in the same sub-band and occupying different sTTIs correspond to the same resources within the TTI for transmission of the first resources scheduling information.

As shown in FIG. 6, with each sTTI, a resources pool available for transmission of data channel(s) includes three sub-bands, the number of resources available for transmission of second resources scheduling information is also three, and the number of resources within each TTI time corresponding to the sTTI available for transmission of first resources scheduling information is also three. Moreover, within each sTTI, the plurality of sub-bands for transmission of the data channel(s) have an one-to-one correspondence with the plurality of resources within the sTTI for transmission of the second resources scheduling information; within each TTI, two data channel resources in the same sub-band and occupying different sTTIs correspond to the same resources within the TTI for transmission of the first resources scheduling information.

Where, in an embodiment, the method further includes: the first terminal device receiving indication information transmitted by a network device, where the indication information is used to indicate a position of a start resources block in the resources pool available for transmission of the second resources scheduling information.

For example, for the second control channel resources transmitted on the sTTI as described above, a configuration parameter startRB-shortPSCCH-pool may be incorporated to indicate an index of a start RB of the resources pool available for transmission of the second resources scheduling information.

Figure 7:
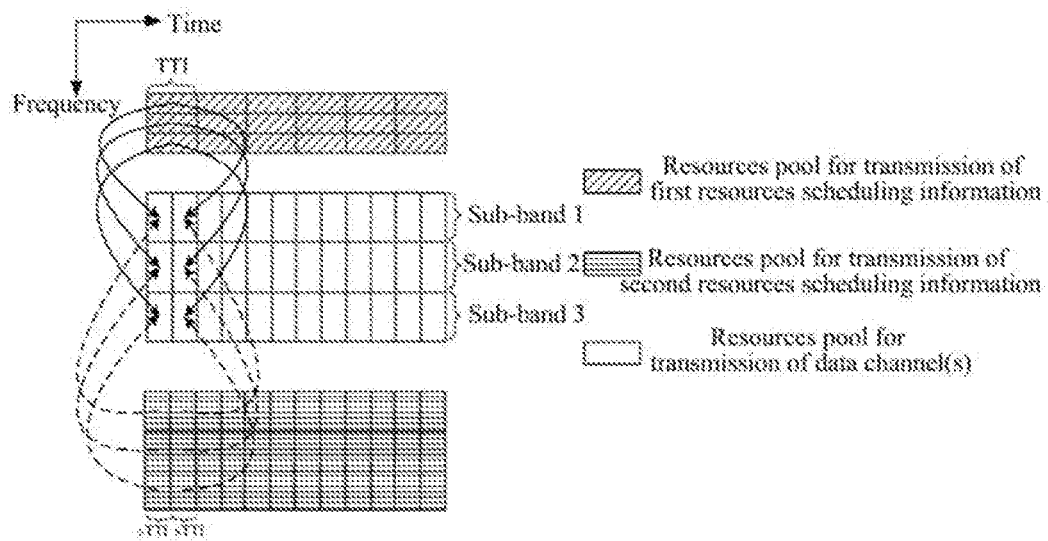
FIG. 7 is a schematic diagram illustrating still another resources allocation according to an embodiment of the present application.

Each TTI shown in FIG. 7 includes two sTTIs, where the number of sub-bands within each sTTI available for transmission of a data channel(s) is equal to the number of resources within the sTTI available for transmission of second resources scheduling information, and the plurality of resources within the sTTI available for transmission of the second resources scheduling information have an one-to-one correspondence with the plurality of sub-bands available for transmission of the data channel(s). Similarly, within the TTI corresponding to the sTTI, the number of resources available for transmission of first resources scheduling information is equal to the number of the plurality of sub-bands within each sTTI available for transmission of the data channel(s). Moreover, for a certain TTI, data channel resources within the TTI in the same sub-band and occupying different sTTIs correspond to the same resources within the TTI for transmission of the first resources scheduling information.

As shown in FIG. 7, within each sTTI, a resources pool available for transmission of data channel(s) includes three sub-bands, the number of resources available for transmission of second resources scheduling information is also three, and the number of resources within each TTI time corresponding to the sTTI available for transmission of first resources scheduling information is also three. Moreover, within each sTTI, the plurality of sub-bands for transmission of the data channel(s) have an one-to-one correspondence with the plurality of resources within the sTTI for transmission of the second resources scheduling information; within each TTI, two data channel resources in the same sub-band and occupying different sTTIs correspond to the same resources within the TTI for transmission of the first resources scheduling information.

Mode 2

In an embodiment, the resources pool available for transmission of the second resources scheduling information includes frequency domain resources of a preset size at an end of each of a plurality of sub-bands.

Where, in an embodiment, if frequency domain resources of the preset size at an end of a first sub-band in which the data channel resources are located are not occupied by the data channel(s), the second control channel resources occupy the frequency domain resources of the preset size at the end of the first sub-band; if the frequency domain resources of the preset size at the end of the first sub-band are at least partially occupied by the data channel(s), the second control channel resources occupy frequency domain resources of the preset size at an end of a second sub-band, where the second sub-band is a next sub-band which is adjacent to the first sub-band and not occupied by the data channel(s).

The frequency domain resources of the preset size may include, for example, a preset number of PRBs, such as one PRB, two PRBs, four PRBs, or other numbers of PRBs.

Specifically, for a case where the first control channel resources are non-adjacent to the data channel resources, the frequency domain resources of the preset size at the end of each sub-band may be used to transmit the second resources scheduling information. For a case where the first control channel resources are adjacent to the data channel resources, the frequency domain resources of the preset size at the end of each sub-band may be used to transmit the second resources scheduling information, and frequency domain resources of a preset size at a start of each sub-band may be used to transmit the first resources scheduling information.

It should be understood that the next sub-band mentioned herein may be, for example, a next numbered sub-band of the first sub-band number. The sub-bands may be numbered in the frequency domain from low to high or from high to low, and transmission of the control channel(s) and the data channel(s) is performed in the frequency domain according to sub-band numbers. For example, the first resources scheduling information is transmitted on two preceding PRBs of sub-band 3, and the data channel(s) is/are transmitted on all remaining PRBs of sub-band 3, then the second resources scheduling information is transmitted on last four PRBs of a next sub-band of sub-band 3 (that is, sub-band 4), that is, the second sub-band is a next sub-band (that is, sub-band 4)

which is adjacent to the first sub-band (that is, sub-band 3) and not occupied by the data channel(s).

In an embodiment, the resources pool available for transmission of the first resources scheduling information includes frequency domain resources of a preset size at a start of each of the sub-bands, where the first control channel resources are adjacent to the data channel resources in a frequency domain.

Figure 8:
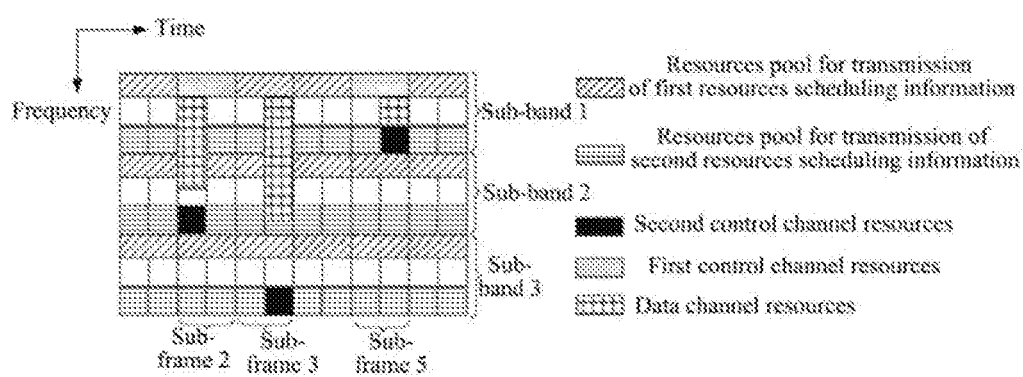
FIG. 8 is a schematic diagram illustrating still another resources allocation according to an embodiment of the present application.

For example, FIG. 8 shows a resources diagram in which three sub-bands are shown, where frequency domain resources of a preset size at a start of each sub-band can be used to transmit the first resources scheduling information, and a terminal device performs, based on a TTI, transmission of the first resources scheduling information on the frequency domain resources of the preset size at the start. Frequency domain resources of a preset size at an end of each sub-band can be used to transmit the second resources scheduling information, and a terminal device performs, based on an sTTI, transmission of the second resources scheduling information on the frequency domain resources of the preset size at the end. It is assumed herein that the sTTI has a length of one slot.

The data channel resources are located in the first sub-band, that is, sub-band 1 in FIG. 8, and is adjacent to the first control channel resources in sub-band 1 for transmission of the first resources scheduling information.

If the data channel resources only occupy sub-band 1, and frequency domain resources of the preset size at an end of sub-band 1 are not occupied by the data channel(s), then the second control channel resources occupy the frequency domain resources of the preset size at the end of sub-band 1, such as the data transmission situation on sub-frame 5 in FIG. 8.

If the data channel(s) occupies/occupy consecutive sub-bands, that is, sub-band 1 and sub-band 2, and frequency domain resources of the preset size at an end of sub-band 2 are not occupied by the data channel(s), then the second control channel resources occupy the frequency domain resources of the preset size at the end of sub-band 2, such as the data transmission situation on sub-frame 2 in FIG. 8.

If the data channel(s) occupies/occupy consecutive sub-bands, that is, sub-band 1 and sub-band 2, and frequency domain resources of the preset size at an end of sub-band 2 are partially occupied by the data channel(s), then the second control channel resources occupy frequency domain resources of the preset size at an end of sub-band 3, such as the data transmission situation on sub-frame 3 in FIG. 8.

After determining second control channel resources, a first terminal device transmits second resources scheduling information on the second control channel resources, and meanwhile transmits the first resources scheduling information on frequency domain resources of a preset size at a start of sub-band 1, in this way, not only can a second terminal device obtain information on data channel resources for the first terminal device, but also a third terminal device can also obtain the information on the data channel resources, so that resources sensing and selecting are performed.

Since both the resources pool available for transmission of the first resources scheduling information and the resources pool available for transmission of the second resources scheduling information are network device-pre-configured or protocol-predetermined, for example, specified in a protocol. Therefore, a first terminal device transmits, in respective corresponding resources pools available for transmission of resources scheduling information of different lengths, two types of resources scheduling information having different lengths, so that a second terminal device and a third terminal device supporting different protocol releases can detect resources scheduling information for the first terminal device in the respective corresponding resources pools to obtain resources usage situation for the first terminal device, thereby jointly performing data transmission in a communication system and reducing interference.

In an embodiment, the second control channel resources are aligned with a time domain start position of the data channel resources, and/or the second control channel resources are aligned with a time domain end position of the data channel resources. For example, as shown in FIG. 8, the second control channel resources and the data channel resources have the same time domain position.

That is to say, the second control channel resources carry second resources scheduling information, where data channel resources corresponding to the second control channel resources carry data channel(s) corresponding to the second resources scheduling information thereon, and the second control channel resources are aligned with a time domain start position and/or a time domain end position of the data channel resources.

Figures 9, 10:
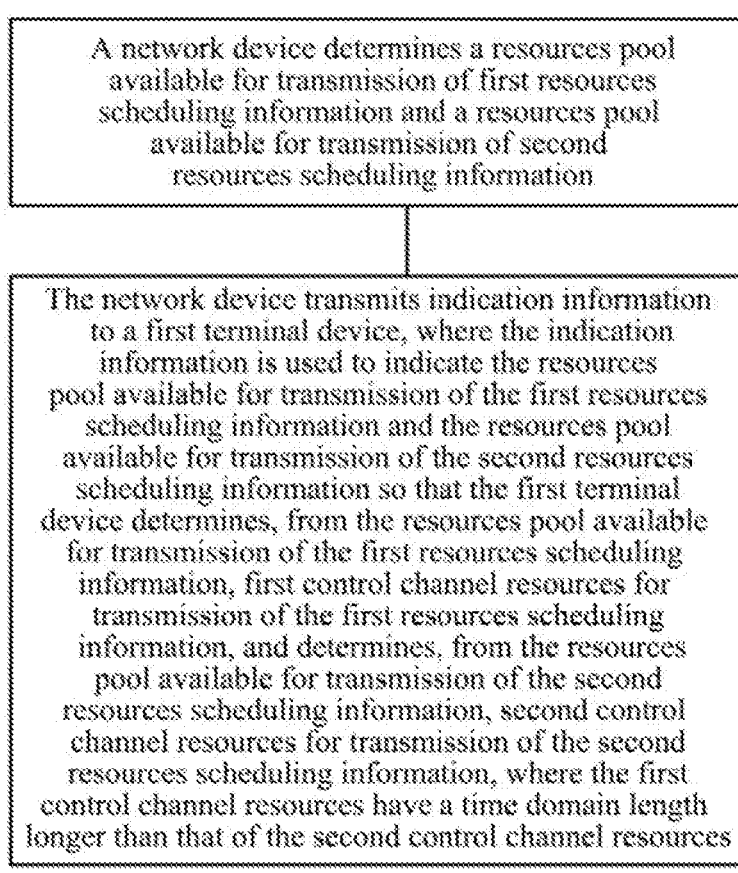
FIG. 9 is a schematic flowchart illustrating a method for D2D communication according to another embodiment of the present application.
FIG. 10 is a schematic flowchart illustrating a method for D2D communication according to still another embodiment of the present application.

FIG. 9 is a schematic flowchart illustrating a method for D2D communication according to an embodiment of the present application. The method shown in FIG. 9 may be performed by a third terminal device which can be, for example, the terminal device 40 shown in FIG. 1. As shown in FIG. 9, the method for D2D communication includes:

In 910, a third terminal device detects second resources scheduling information transmitted by a first terminal device from pre-configured resources pool available for transmission of the second resources scheduling information, where the second resources scheduling information occupies second control channel resources, and where the second control channel resources have a time domain length shorter than that of first control channel resources, and the first control channel resources are used by the first terminal device to transmit first resources scheduling information.

In 920, the third terminal device determines, according to the second resources scheduling information, data channel resources available for the first terminal device to transmit data channel(s).

Where the first resources scheduling information is used by a second terminal device to determine the data channel resources; the second terminal device is capable of detecting resources scheduling information based on the time domain length of the first control channel resources, and the third terminal device is capable of detecting resources scheduling information based on the time domain length of the first control channel resources and/or the time domain length of the second control channel resources.

Therefore, a terminal device detects, based on a length of control channel resources that can be detected by itself, resources scheduling information transmitted by other terminal device, in a resources pool for transmission of the resources scheduling information of this length, to obtain resources usage situation for the other terminal device. Therefore, data transmission is performed jointly in a communication system and interference is avoided.

In an embodiment, the second control channel resources are located between the first control channel resources and the data channel resources in a frequency domain; or the data channel(s) is/are located between the first control channel resources and the second control channel resources in a frequency domain; or the first control channel resources are located between the second control channel resources and the data channel resources in a frequency domain.

In an embodiment, the data channel resources are adjacent or non-adjacent to the first control channel resources in a frequency domain, the data channel resources are adjacent or non-adjacent to the second control channel resources in a frequency domain, and the first control channel resources are adjacent or non-adjacent to the second control channel resources in a frequency domain.

In an embodiment, the method further includes: the third terminal device receiving indication information transmitted by a network device, where the indication information is used to indicate a position of a start resources block in the resources pool available for transmission of the second resources scheduling information.

In an embodiment, the resources pool available for transmission of the second resources scheduling information includes frequency domain resources of a preset size at an end of each of a plurality of sub-bands.

In an embodiment, if frequency domain resources of the preset size at an end of a first sub-band in which the data channel resources are located are not occupied by the data channel(s), the second control channel resources occupy the frequency domain resources of the preset size at the end of the first sub-band; if the frequency domain resources of the preset size at the end of the first sub-band are at least partially occupied by the data channel(s), the second control channel resources occupy frequency domain resources of the preset size at an end of a second sub-band, where the second sub-band is a next sub-band which is adjacent to the first sub-band and not occupied by the data channel(s).

In an embodiment, the resources pool available for transmission of the first resources scheduling information includes frequency domain resources of a preset sire at a start of each of the sub-bands, where the first control channel resources are adjacent to the data channel resources in a frequency domain.

In an embodiment, the resources pool available for transmission of the second resources scheduling information is configured by network device or agreed in protocol, and the resources pool available for transmission of the first resources scheduling information is configured by network device or agreed in protocol.

In an embodiment, the second control channel resources are aligned with a time domain start position of the data channel resources, and/or the second control channel resources are aligned with a time domain end position of the data channel resources.

In an embodiment, the second terminal device supports a communication protocol of Release-14 and does not support a communication protocol of Release-IS, while the first terminal device and the third terminal device support a communication protocol of Release-5.

In an embodiment, the first terminal device is a vehicle terminal or a handheld terminal; the second terminal device is a vehicle terminal or a handheld terminal; and the third terminal device is a vehicle terminal or a handheld terminal.

It should be understood that, for a process of D2D communication between the third terminal device and the first terminal device and resources allocation situation, reference may be specifically made to the foregoing descriptions of FIG. 4 to FIG. 8 with respect to the first terminal device, and for the sake of brevity, details will not be described herein again.

FIG. 10 is a schematic flowchart illustrating a method for D2D communication according to an embodiment of the present application. The method shown in FIG. 10 may be performed by a network device, which can be, for example, the network device 10 shown in FIG. 1. As shown in FIG. 10, the method for D2D communication includes:

In 1010, a network device determines a resources pool available for transmission of first resources scheduling information and a resources pool available for transmission of second resources scheduling information.

In 1020, the network device transmits indication information to a first terminal device, where the indication information is used to indicate the resources pool available for transmission of the first resources scheduling information and the resources pool available for transmission of the second resources scheduling information so that the first terminal device determines, from the resources pool available for transmission of the first resources scheduling information, first control channel resources for transmission of the first resources scheduling information, and determines, from the resources pool available for transmission of the second resources scheduling information, second control channel resources for transmission of the second resources scheduling information, where the first control channel resources have a time domain length longer than that of the second control channel resources.

Where the first resources scheduling information is used by a second terminal device to determine data channel resources available for the first terminal device to transmit data channel(s), and the second resources scheduling information is used by a third terminal device to determine the data channel resources; the second terminal device is capable of detecting resources scheduling information based on the time domain length of the first control channel resources, and the third terminal device is capable of detecting resources scheduling information based on the time domain length of the first control channel resources and/or the time domain length of the second control channel resources.

Therefore, a network device pre-configures resources pools available for transmission of resources scheduling information of different lengths to enable a first terminal device to respectively transmit two types of resources scheduling information having different lengths in preset different resources pools, so that a second terminal device and a third terminal device supporting different protocol releases can detect resources scheduling information for the first terminal device in the respective corresponding resources pools to obtain resources usage situation for the first terminal device, thereby jointly performing data transmission in a communication system and reducing interference.

In an embodiment, the second control channel resources are located between the first control channel resources and the data channel resources in a frequency domain; or the data channel(s) is/are located between the first control channel resources and the second control channel resources in a frequency domain; or the first control channel resources are located between the second control channel resources and the data channel resources in a frequency domain.

In an embodiment, the data channel resources are adjacent or non-adjacent to the first control channel resources in a frequency domain, the data channel resources are adjacent or non-adjacent to the second control channel resources in a frequency domain, and the first control channel resources are adjacent or non-adjacent to the second control channel resources in a frequency domain.

In an embodiment, the indication information includes information on a start resources block in the resources pool available for transmission of the second resources scheduling information, such as an index of the start resources block.

In an embodiment, the resources pool available for transmission of the second resources scheduling information includes frequency domain resources of a preset size at an end of each of a plurality of sub-bands.

In an embodiment, if frequency domain resources of the preset size at an end of a first sub-band in which the data channel resources are located are not occupied by the data channel(s), the second control channel resources occupy the frequency domain resources of the preset size at the end of the first sub-band; if the frequency domain resources of the preset size at the end of the first sub-band are at least partially occupied by the data channel(s), the second control channel resources occupy frequency domain resources of the preset size at an end of a second sub-band, where the second sub-band is a next sub-band which is adjacent to the first sub-band and not occupied by the data channel(s).

In an embodiment, the resources pool available for transmission of the first resources scheduling information includes frequency domain resources of a preset size at a start of each of the sub-bands, where the first control channel resources are adjacent to the data channel resources in a frequency domain.

In an embodiment, the resources pool available for transmission of the second resources scheduling information is configured by network device or agreed in protocol, and the resources pool available for transmission of the first resources scheduling information is configured by network device or agreed in protocol.

In an embodiment, the second control channel resources are aligned with a time domain start position of the data channel resources, and/or the second control channel resources are aligned with a time domain end position of the data channel resources.

In an embodiment, the second terminal device supports a communication protocol of Release-14 and does not support a communication protocol of Release-15, while the first terminal device and the third terminal device support a communication protocol of Release-15.

In an embodiment, the first terminal device is a vehicle terminal or a handheld terminal; the second terminal device is a vehicle terminal or a handheld terminal; and the third terminal device is a vehicle terminal or a handheld terminal.

It should be understood that, for the control channel resources and the data channel resources preconfigured by the network device as described above, reference may be specifically made to the foregoing descriptions of FIG. 4 to FIG. 8 with respect to the first terminal device, and for the sake of brevity, details will not be described herein again.

It should also be understood that, in various embodiments of the present application, the sequence numbers of the above processes do not imply an execution order. The execution order of the processes should be determined by their functions and internal logic, but is not intended to limit an implementation in the embodiments of the present application.

The methods for D2D communication according to the embodiments of the present application have been described in detail above. Hereinafter, devices according to embodiments of the present application will be described with reference to FIG. 11 to FIG. 17, and the technical features described in the method embodiments are applicable to the following device embodiments.

Figure 11:
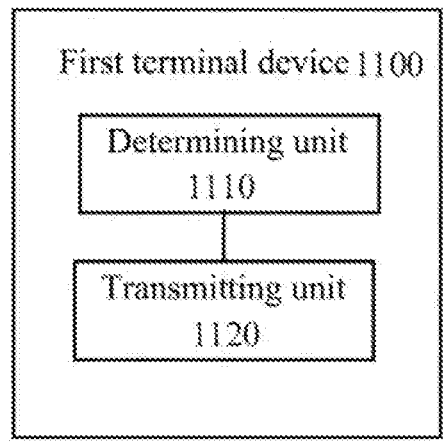
FIG. 11 is a schematic block diagram illustrating a first terminal device according to an embodiment of the present application.

FIG. 11 is a schematic block diagram illustrating a terminal device 1100 according to an embodiment of the present application. As shown in FIG. 11, the terminal device is a first terminal device, and the first terminal device 1100 includes a determining unit 1110 and a transmitting unit 1120. Wherein:

the determining unit 1110 is configured to determine first control channel resources from pre-configured resources pool available for transmission of first resources scheduling information, and determine second control channel resources from the pre-configured resources pool available for transmission of second resources scheduling information, where the first control channel resources have a time domain length longer that of the second control channel resources;

the transmitting unit 1120 is configured to transmit the first resources scheduling information on the first control channel resources, and transmit the second resources scheduling information on the second control channel resources;

where the first resources scheduling information is used by a second terminal device to determine data channel resources available for the first terminal device to transmit data channel(s), and the second resources scheduling information is used by a third terminal device to determine the data channel resources; the second terminal device is capable of detecting resources scheduling information based on the time domain length of the first control channel resources, and the third terminal device is capable of detecting resources scheduling information based on the time domain length of the first control channel resources and/or the time domain length of the second control channel resources.

Therefore, a first terminal device transmits, in respective corresponding resources pools available for transmission of resources scheduling information of different lengths, two types of resources scheduling information having different lengths, so that a second terminal device and a third terminal device supporting different protocol releases can detect resources scheduling information for the first terminal device in the respective corresponding resources pools to obtain resources usage situation for the first terminal device, thereby jointly performing data transmission in a communication system and reducing interference.

In an embodiment, the second control channel resources are located between the first control channel resources and the data channel resources in a frequency domain; or the data channel(s) is/are located between the first control channel resources and the second control channel resources in a frequency domain; or the first control channel resources are located between the second control channel resources and the data channel resources in a frequency domain.

In an embodiment, the data channel resources are adjacent or non-adjacent to the first control channel resources in a frequency domain, the data channel resources are adjacent or non-adjacent to the second control channel resources in a frequency domain, and the first control channel resources are adjacent or non-adjacent to the second control channel resources in a frequency domain.

In an embodiment, the transmitting unit 1120 is further configured to: receive indication information transmitted by a network device, where the indication information is used to indicate a position of a start resources block in the resources pool available for transmission of the second resources scheduling information.

In an embodiment, the resources pool available for transmission of the second resources scheduling information includes frequency domain resources of a preset size at an end of each of a plurality of sub-bands.

In an embodiment, if frequency domain resources of the preset size at an end of a first sub-band in which the data channel resources are located are not occupied by the data channel(s), the second control channel resources occupy the frequency domain resources of the preset size at the end of the first sub-band; if the frequency domain resources of the preset size at the end of the first sub-band are at least partially occupied by the data channel(s), the second control channel resources occupy frequency domain resources of the preset size at an end of a second sub-band, where the second sub-band is a next sub-band which is adjacent to the first sub-band and not occupied by the data channel(s).

In an embodiment, the resources pool available for transmission of the first resources scheduling information includes frequency domain resources of a preset size at a start of each of the sub-bands, where the first control channel resources are adjacent to the data channel resources in a frequency domain.

In an embodiment, the resources pool available for transmission of the second resources scheduling information is configured by network device or agreed in protocol, and the resources pool available for transmission of the first resources scheduling information is configured by network device or agreed in protocol.

In an embodiment, the second control channel resources are aligned with a time domain start position of the data channel resources, and/or the second control channel resources are aligned with a time domain end position of the data channel resources.

In an embodiment, the second terminal device supports a communication protocol of Release-14 and does not support a communication protocol of Release-15, while the first terminal device and the third terminal device support a communication protocol of Release-15.

In an embodiment, the first terminal device is a vehicle terminal or a handheld terminal; the second terminal device is a vehicle terminal or a handheld terminal; and the third terminal device is a vehicle terminal or a handheld terminal.

Figure 12:
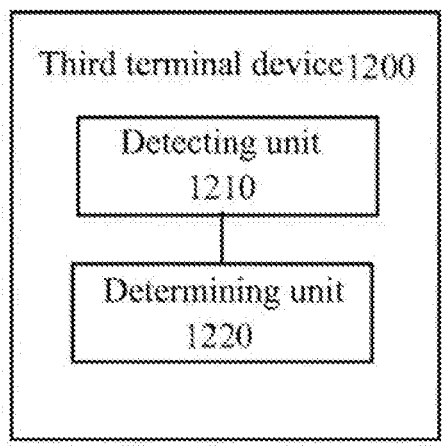
FIG. 12 is a schematic block diagram illustrating a third terminal device according to an embodiment of the present application.

FIG. 12 is a schematic block diagram illustrating a terminal device 1200 according to an embodiment of the present application. As shown in FIG. 12, the terminal device is a third terminal device, and the third terminal device 1200 includes a detecting unit 1210 and a determining unit 1220. Wherein:

the detecting unit 1210 is configured to detect second resources scheduling information from pre-configured resources pool available for transmission of the second resources scheduling information, where the second resources scheduling information occupies second control channel resources, and where the second control channel resources have a time domain length shorter than that of first control channel resources, the first control channel resources are resources occupied by first resources scheduling information transmitted by the first terminal device, and the first control channel resources are determined by the first terminal device from a resources pool available for transmission of the first resources scheduling information;

the determining unit 1220 is configured to determine, according to the second resources scheduling information, data channel resources available for the first terminal device to transmit data channel(s);

where the first resources scheduling information is used by a second terminal device to determine data channel resources available for the first terminal device to transmit data channel(s); the second terminal device is capable of detecting resources scheduling information based on the time domain length of the first control channel resources, and the third terminal device is capable of detecting resources scheduling information based on the time domain length of the first control channel resources and/or the time domain length of the second control channel resources.

Therefore, a terminal device detects, based on a length of control channel resources that can be detected by itself, resources scheduling information transmitted by other terminal device, in a resources pool for transmission of the resources scheduling information of this length, to obtain resources usage situation for the other terminal device. Therefore, data transmission is performed jointly in a communication system and interference is avoided.

In an embodiment, the second control channel resources are located between the first control channel resources and the data channel resources in a frequency domain; or the data channel(s) is/are located between the first control channel resources and the second control channel resources in a frequency domain; or the first control channel resources are located between the second control channel resources and the data channel resources in a frequency domain.

In an embodiment, the data channel resources are adjacent or non-adjacent to the first control channel resources in a frequency domain, the data channel resources are adjacent or non-adjacent to the second control channel resources in a frequency domain, and the first control channel resources are adjacent or non-adjacent to the second control channel resources in a frequency domain.

In an embodiment, the third terminal device further includes a transmitting unit which is configured to: receive indication information transmitted by a network device, where the indication information is used to indicate a position of a start resources block in the resources pool available for transmission of the second resources scheduling information.

In an embodiment, the resources pool available for transmission of the second resources scheduling information includes frequency domain resources of a preset size at an end of each of a plurality of sub-bands.

In an embodiment, if frequency domain resources of the preset size at an end of a first sub-band in which the data channel resources are located are not occupied by the data channel(s), the second control channel resources occupy the frequency domain resources of the preset size at the end of the first sub-band; if the frequency domain resources of the preset size at the end of the first sub-band are at least partially occupied by the data channel(s), the second control channel resources occupy frequency domain resources of the preset size at an end of a second sub-band, where the second sub-band is a next sub-band which is adjacent to the first sub-band and not occupied by the data channel(s).

In an embodiment, the resources pool available for transmission of the first resources scheduling information includes frequency domain resources of a preset size at a start of each of the sub-bands, where the first control channel resources are adjacent to the data channel resources in a frequency domain.

In an embodiment, the resources pool available for transmission of the second resources scheduling information is configured by network device or agreed in protocol, and the resources pool available for transmission of the first resources scheduling information is configured by network device or agreed in protocol.

In an embodiment, the second control channel resources are aligned with a time domain start position of the data channel resources, and/or the second control channel resources are aligned with a time domain end position of the data channel resources.

In an embodiment, the second terminal device supports a communication protocol of Release-14 and does not support a communication protocol of Release-5, while the first terminal device and the third terminal device support a communication protocol of Release-15.

In an embodiment, the first terminal device is a vehicle terminal or a handheld terminal; the second terminal device is a vehicle terminal or a handheld terminal; and the third terminal device is a vehicle terminal or a handheld terminal.

Figure 13:
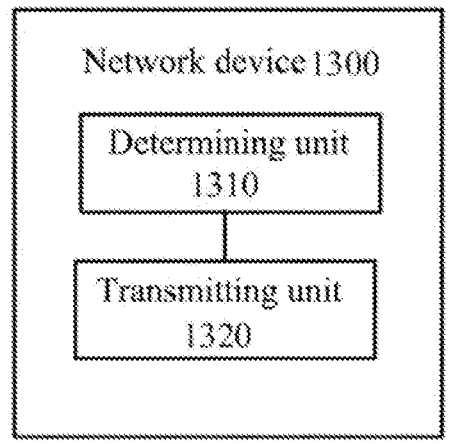
FIG. 13 is a schematic block diagram illustrating a network device according to an embodiment of the present application.

FIG. 13 is a schematic block diagram illustrating a network device 1300 according to an embodiment of the present application. As shown in FIG. 13, the network device 1300 includes a determining unit 1310 and a transmitting unit 1320. Where:

the determining unit 1310 is configured to determine a resources pool available for transmission of first resources scheduling information and a resources pool available for transmission of second resources scheduling information;

the transmitting unit 1320 is configured to transmit indication information to a first terminal device, where the indication information is used to indicate the resources pool available for transmission of the first resources scheduling information and the resources pool available for transmission of the second resources scheduling information so that the first terminal device determines, from the resources pool available for transmission of the first resources scheduling information, first control channel resources for transmission of the first resources scheduling information, and determines, from the resources pool available for transmission of the second resources scheduling information, second control channel resources for transmission of the second resources scheduling information, where the first control channel resources have a time domain length longer than that of the second control channel resources;

where the first resources scheduling information is used by a second terminal device to determine data channel resources available for the first terminal device to transmit data channel(s), and the second resources scheduling information is used by a third terminal device to determine the data channel resources; the second terminal device is capable of detecting resources scheduling information based on the time domain length of the first control channel resources, and the third terminal device is capable of detecting resources scheduling information based on the time domain length of the first control channel resources and/or the time domain length of the second control channel resources.

Therefore, a network device pre-configures resources pools available for transmission of resources scheduling information of different lengths to enable a first terminal device to respectively transmit two types of resources scheduling information having different lengths in preset different resources pools, so that a second terminal device and a third terminal device supporting different protocol releases can detect resources scheduling information for the first terminal device in the respective corresponding resources pools to obtain resources usage situation for the first terminal device, thereby jointly performing data transmission in a communication system and reducing interference.

In an embodiment, the second control channel resources are located between the first control channel resources and the data channel resources in a frequency domain; or the data channel(s) is/are located between the first control channel resources and the second control channel resources in a frequency domain; or the first control channel resources are located between the second control channel resources and the data channel resources in a frequency domain.

In an embodiment, the data channel resources are adjacent or non-adjacent to the first control channel resources in a frequency domain, the data channel resources are adjacent or non-adjacent to the second control channel resources in a frequency domain, and the first control channel resources are adjacent or non-adjacent to the second control channel resources in a frequency domain.

In an embodiment, the indication information includes information on a start resources block in the resources pool available for transmission of the second resources scheduling information.

In an embodiment, the resources pool available for transmission of the second resources scheduling information includes frequency domain resources of a preset size at an end of each of a plurality of sub-bands.

In an embodiment, if frequency domain resources of the preset size at an end of a first sub-band in which the data channel resources are located are not occupied by the data channel(s), the second control channel resources occupy the frequency domain resources of the preset size at the end of the first sub-band; if the frequency domain resources of the preset size at the end of the first sub-band are at least partially occupied by the data channel(s), the second control channel resources occupy frequency domain resources of the preset size at an end of a second sub-band, where the second sub-band is a next sub-band which is adjacent to the first sub-band and not occupied by the data channel(s).

In an embodiment, the resources pool available for transmission of the first resources scheduling information includes frequency domain resources of a preset size at a start of each of the sub-bands, where the first control channel resources are adjacent to the data channel resources in a frequency domain.

In an embodiment, the resources pool available for transmission of the second resources scheduling information is configured by network device or agreed in protocol, and the resources pool available for transmission of the first resources scheduling information is configured by network device or agreed in protocol.

In an embodiment, the second control channel resources are aligned with a time domain start position of the data channel resources, and/or the second control channel resources are aligned with a time domain end position of the data channel resources.

In an embodiment, the second terminal device supports a communication protocol of Release-14 and does not support a communication protocol of Release-15, while the first terminal device and the third terminal device support a communication protocol of Release-15.

In an embodiment, the first terminal device is a vehicle terminal or a handheld terminal; the second terminal device is a vehicle terminal or a handheld terminal; and the third terminal device is a vehicle terminal or a handheld terminal.

Figure 14:
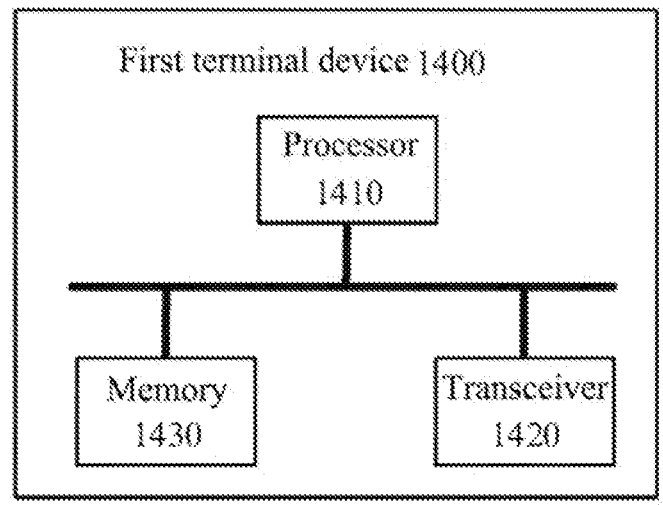
FIG. 14 is a schematic structural diagram illustrating a first terminal device according to an embodiment of the present application.

FIG. 14 is a schematic structural diagram illustrating a terminal device 1400 according to an embodiment of the present application. As shown in FIG. 14, the terminal device is a first terminal device which includes a processor 1410, a transceiver 1420, and a memory 1430, where the processor 1410, the transceiver 1420, and the memory 1430 communicate with each other via an internal connection path. The memory 1430 is configured to store an instruction, and the processor 1410 is configured to execute the instruction stored in the memory 1430 to control the transceiver 1420 to receive a signal or transmit a signal. Where the processor 1410 is configured to:

determine first control channel resources from pre-configured resources pool available for transmission of first resources scheduling information, and determine second control channel resources from the pre-configured resources pool available for transmission of second resources scheduling information, where the first control channel resources have a time domain length longer that of the second control channel resources;

the transceiver 1420 is configured to: transmit the first resources scheduling information on the first control channel resources, and transmit the second resources scheduling information on the second control channel resources;

where the first resources scheduling information is used by a second terminal device to determine data channel resources available for the first terminal device to transmit data channel(s), and the second resources scheduling information is used by a third terminal device to determine the data channel resources; the second terminal device is capable of detecting resources scheduling information based on the time domain length of the first control channel resources, and the third terminal device is capable of detecting resources scheduling information based on the time domain length of the first control channel resources and/or the time domain length of the second control channel resources.

In an embodiment, the second control channel resources are located between the first control channel resources and the data channel resources in a frequency domain; or the data channel(s) is/are located between the first control channel resources and the second control channel resources in a frequency domain, or the first control channel resources are located between the second control channel resources and the data channel resources in a frequency domain.

In an embodiment, the data channel resources are adjacent or non-adjacent to the first control channel resources in a frequency domain, the data channel resources are adjacent or non-adjacent to the second control channel resources in a frequency domain, and the first control channel resources are adjacent or non-adjacent to the second control channel resources in a frequency domain.

In an embodiment, the transceiver 1420 is further configured to receive indication information transmitted by a network device, where the indication information is used to indicate a position of a start resources block in the resources pool available for transmission of the second resources scheduling information.

In an embodiment, the resources pool available for transmission of the second resources scheduling information includes frequency domain resources of a preset size at an end of each of a plurality of sub-bands.

In an embodiment, if frequency domain resources of the preset size at an end of a first sub-band in which the data channel resources are located are not occupied by the data channel(s), the second control channel resources occupy the frequency domain resources of the preset size at the end of the first sub-band; if the frequency domain resources of the preset size at the end of the first sub-band are at least partially occupied by the data channel(s), the second control channel resources occupy frequency domain resources of the preset size at an end of a second sub-band, where the second sub-band is a next sub-band which is adjacent to the first sub-band and not occupied by the data channel(s).

In an embodiment, the resources pool available for transmission of the first resources scheduling information includes frequency domain resources of a preset size at a start of each of the sub-bands, where the first control channel resources are adjacent to the data channel resources in a frequency domain.

In an embodiment, the resources pool available for transmission of the second resources scheduling information is configured by network device or agreed in protocol, and the resources pool available for transmission of the first resources scheduling information is configured by network device or agreed in protocol.

It should be understood that, in the embodiment of the present application, the processor 1410 may be a Central Processing Unit (CPU). The processor 1410 may also be other general-purpose processor, Digital Signal Processor (DSP), Application Specific Integrated Circuit (ASIC), Field Programmable Gate Array (FPGA) or other programmable logic device, discrete gate or transistor logic device, discrete hardware component, or the like. The general-purpose processor may be a microprocessor or the processor may also be any conventional processor, or the like.

The memory 1430 may include a read only memory and a random access memory, and provides instructions and data to the processor 1410. A portion of the memory 1430 may also include a non-volatile random access memory.

During an implementation, each of steps of the foregoing methods may be implemented by an integrated logic circuit of hardware or an instruction in a form of software in the processor 1410. The steps of the various methods disclosed in conjunction with the embodiments of the present application may be directly implemented by a hardware processor, or may be implemented by a combination of hardware and software modules in the processor 1410. The software module may be located in a storage medium mature in the art, such as a random access memory, a flash memory, a read only memory, a programmable read only memory, an electrically erasable programmable memory, a register, or the like. The storage medium is located in the memory 1430. The processor 1410 reads information in the memory 1430 and implements the steps of the above methods in conjunction with its hardware. To avoid redundancy, details will not be described herein again.

The terminal device 1400 according to the embodiment of the present application may correspond to the terminal device for performing the method 400 in the foregoing method 400 and the terminal device 110X) according to the embodiment of the present application, and each of units or modules in the terminal device 1400 are respectively configured to implement each of operations or processes performed by the terminal device in the above method 40K). Herein, in order to avoid redundancy, detailed description thereof will be omitted.

Figure 15:
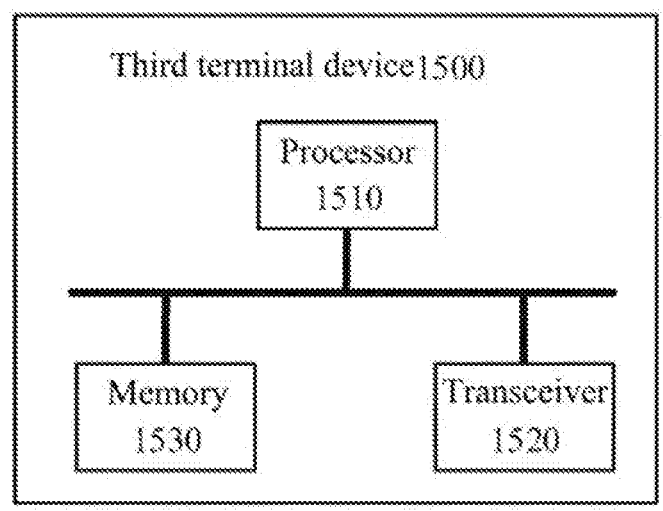
FIG. 15 is a schematic structural diagram illustrating a third terminal device according to an embodiment of the present application.

FIG. 15 is a schematic structural diagram of a terminal device 1500 according to an embodiment of the present application. As shown in FIG. 15, the terminal device is a third terminal device which includes a processor 1510, a transceiver 1520, and a memory 1530, where the processor 1510, the transceiver 1520, and the memory 1530 communicate with each other via an internal connection path. The memory 1530 is configured to store an instruction, and the processor 1510 is configured to execute the instruction stored in the memory 1530 to control the transceiver 1520 to receive a signal or transmit a signal. Where the processor 1510 is configured to:

detect second resources scheduling information transmitted by a first terminal device from pre-configured resources pool available for transmission of the second resources scheduling information, where the second resources scheduling information occupies second control channel resources, and where the second control channel resources have a time domain length shorter than that of first control channel resources, and the first control channel resources are used by the first terminal device to transmit first resources scheduling information;

determine, according to the second resources scheduling information, data channel resources available for the first terminal device to transmit data channel(s);

where the first resources scheduling information is used by a second terminal device to determine the data channel resources; the second terminal device is capable of detecting resources scheduling information based on the time domain length of the first control channel resources, and the third terminal device is capable of detecting resources scheduling information based on the time domain length of the first control channel resources and/or the time domain length of the second control channel resources.

In an embodiment, the second control channel resources are located between the first control channel resources and the data channel resources in a frequency domain; or the data channel(s) is/are located between the first control channel resources and the second control channel resources in a frequency domain; or the first control channel resources are located between the second control channel resources and the data channel resources in a frequency domain.

In an embodiment, the data channel resources are adjacent or non-adjacent to the first control channel resources in a frequency domain, the data channel resources are adjacent or non-adjacent to the second control channel resources in a frequency domain, and the first control channel resources are adjacent or non-adjacent to the second control channel resources in a frequency domain.

In an embodiment, the transceiver 1520 is further configured to receive indication information transmitted by a network device, where the indication information is used to indicate a position of a start resources block in the resources pool available for transmission of the second resources scheduling information.

In an embodiment, the resources pool available for transmission of the second resources scheduling information includes frequency domain resources of a preset size at an end of each of a plurality of sub-bands.

In an embodiment, if frequency domain resources of the preset size at an end of a first sub-band in which the data channel resources are located are not occupied by the data channel(s), the second control channel resources occupy the frequency domain resources of the preset size at the end of the first sub-band; if the frequency domain resources of the preset size at the end of the first sub-band are at least partially occupied by the data channel(s), the second control channel resources occupy frequency domain resources of the preset size at an end of a second sub-band, where the second sub-band is a next sub-band which is adjacent to the first sub-band and not occupied by the data channel(s).

In an embodiment, the resources pool available for transmission of the first resources scheduling information includes frequency domain resources of a preset size at a start of each of the sub-bands, where the first control channel resources are adjacent to the data channel resources in a frequency domain.

In an embodiment, the resources pool available for transmission of the second resources scheduling information is configured by network device or agreed in protocol, and the resources pool available for transmission of the first resources scheduling information is configured by network device or agreed in protocol.

It should be understood that, in the embodiment of the present application, the processor 1510 may be a Central Processing Unit (CPU). The processor 1510 may also be other general-purpose processor, Digital Signal Processor (DSP), Application Specific Integrated Circuit (ASIC), Field Programmable Gate Array (FPGA) or other programmable logic device, discrete gate or transistor logic device, discrete hardware component, or the like. The general-purpose processor may be a microprocessor or the processor may also be any conventional processor, or the like.

The memory 1530 may include a read only memory and a random access memory, and provides instructions and data to the processor 1510. A portion of the memory 1530 may also include a non-volatile random access memory.

During an implementation, each of steps of the foregoing methods may be implemented by an integrated logic circuit of hardware or an instruction in a form of software in the processor 1510. The steps of the various methods disclosed in conjunction with the embodiments of the present application may be directly implemented by a hardware processor, or may be implemented by a combination of hardware and software modules in the processor 1510. The software module may be located in a storage medium mature in the art, such as a random access memory, a flash memory, a read only memory, a programmable read only memory, an electrically erasable programmable memory, a register, or the like. The storage medium is located in the memory 1530. The processor 1510 reads information in the memory 1530 and implements the steps of the above methods in conjunction with its hardware. To avoid redundancy, details will not be described herein again.

The terminal device 1500 according to the embodiment of the present application may correspond to the terminal device for performing the method 900 in the foregoing method 900 and the terminal device 1200 according to the embodiment of the present application, and each of units or modules in the terminal device 1500 are respectively configured to implement each of operations or processes performed by the terminal device in the above method 900. Herein, in order to avoid redundancy, detailed description thereof will be omitted.

Figure 16:
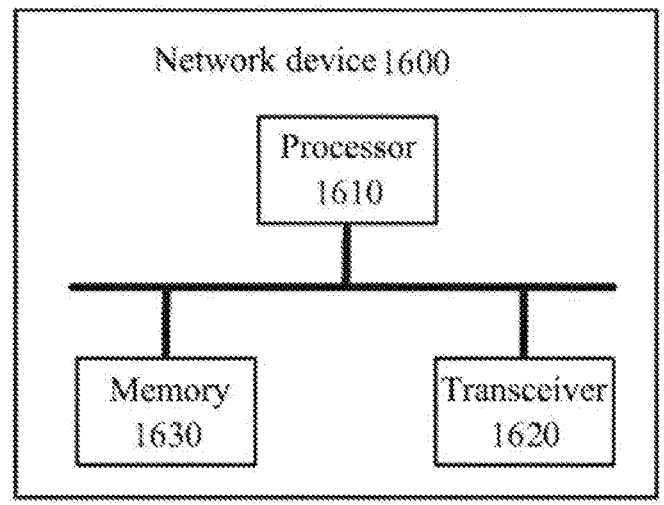
FIG. 16 is a schematic structural diagram illustrating a network device according to an embodiment of the present application.

FIG. 16 is a schematic structural diagram illustrating a network device 1600 according to an embodiment of the present application. As shown in FIG. 16, the network device includes a processor 1610, a transceiver 1620, and a memory 1630, where the processor 1610, the transceiver 1620, and the memory 1630 communicate with each other via an internal connection path. The memory 1630 is configured to store an instruction, and the processor 1610 is configured to execute the instruction stored in the memory 1630 to control the transceiver 1620 to receive a signal or transmit a signal. Where the processor 1610 is configured to:

determine a resources pool available for transmission of first resources scheduling information and a resources pool available for transmission of second resources scheduling information;

the transceiver 1620 is configured to: transmit indication information to a first terminal device, where the indication information is used to indicate the resources pool available for transmission of the first resources scheduling information and the resources pool available for transmission of the second resources scheduling information so that the first terminal device determines, from the resources pool available for transmission of the first resources scheduling information, first control channel resources for transmission of the first resources scheduling information, and determines, from the resources pool available for transmission of the second resources scheduling information, second control channel resources for transmission of the second resources scheduling information, where the first control channel resources have a time domain length longer than that of the second control channel resources;

where the first resources scheduling information is used by a second terminal device to determine data channel resources available for the first terminal device to transmit data channel(s), and the second resources scheduling information is used by a third terminal device to determine the data channel resources; the second terminal device is capable of detecting resources scheduling information based on the time domain length of the first control channel resources, and the third terminal device is capable of detecting resources scheduling information based on the time domain length of the first control channel resources and/or the time domain length of the second control channel resources.

In an embodiment, the second control channel resources are located between the first control channel resources and the data channel resources in a frequency domain; or the data channel(s) is/are located between the first control channel resources and the second control channel resources in a frequency domain; or the first control channel resources are located between the second control channel resources and the data channel resources in a frequency domain.

In an embodiment, the data channel resources are adjacent or non-adjacent to the first control channel resources in a frequency domain, the data channel resources are adjacent or non-adjacent to the second control channel resources in a frequency domain, and the first control channel resources are adjacent or non-adjacent to the second control channel resources in a frequency domain.

In an embodiment, the indication information includes information on a start resources block in the resources pool available for transmission of the second resources scheduling information.

In an embodiment, the resources pool available for transmission of the second resources scheduling information includes frequency domain resources of a preset size at an end of each of a plurality of sub-bands.

In an embodiment, if frequency domain resources of the preset size at an end of a first sub-band in which the data channel resources are located are not occupied by the data channel(s), the second control channel resources occupy the frequency domain resources of the preset size at the end of the first sub-band; if the frequency domain resources of the preset size at the end of the first sub-band are at least partially occupied by the data channel(s), the second control channel resources occupy frequency domain resources of the preset size at an end of a second sub-band, where the second sub-band is a next sub-band which is adjacent to the first sub-band and not occupied by the data channel(s).

In an embodiment, the resources pool available for transmission of the first resources scheduling information includes frequency domain resources of a preset size at a start of each of the sub-bands, where the first control channel resources are adjacent to the data channel resources in a frequency domain.

In an embodiment, the resources pool available for transmission of the second resources scheduling information is configured by network device or agreed in protocol, and the resources pool available for transmission of the first resources scheduling information is configured by network device or agreed in protocol.

It should be understood that, in the embodiment of the present application, the processor 1610 may be a Central Processing Unit (CPU). The processor 1610 may also be other general-purpose processor, Digital Signal Processor (DSP), Application Specific Integrated Circuit (ASIC), Field Programmable Gate Array (FPGA) or other programmable logic device, discrete gate or transistor logic device, discrete hardware component, or the like. The general-purpose processor may be a microprocessor or the processor may also be any conventional processor, or the like.

The memory 1630 may include a read only memory and a random access memory, and provides instructions and data to the processor 1610. A portion of the memory 1630 may also include a non-volatile random access memory. During an implementation, each of steps of the foregoing methods may be implemented by an integrated logic circuit of hardware or an instruction in a form of software in the processor 1610. The steps of the various methods disclosed in conjunction with the embodiments of the present application may be directly implemented by a hardware processor, or may be implemented by a combination of hardware and software modules in the processor 1610. The software module may be located in a storage medium mature in the art, such as a random access memory, a flash memory, a read only memory, a programmable read only memory, an electrically erasable programmable memory, a register, or the like. The storage medium is located in the memory 1630. The processor 1610 reads information in the memory 1630 and implements the steps of the above methods in conjunction with its hardware. To avoid redundancy, details will not be described herein again.

The network device 1600 according to the embodiment of the present application may correspond to the network device for performing the method 1000 in the foregoing method 1000 and the network device 1300 according to the embodiment of the present application, and each of units or modules in the network device 1600 are respectively configured to implement each of operations or processes performed by the network device in the above method 1000. Herein, in order to avoid redundancy, detailed description thereof will be omitted.

Figure 17:
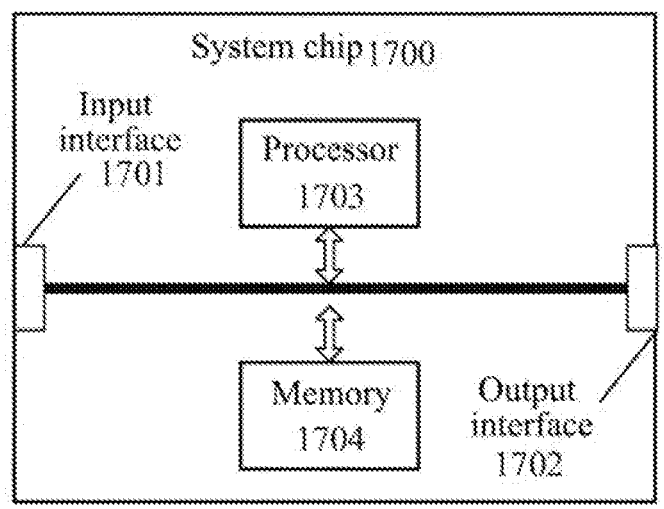
FIG. 17 is a schematic structural diagram illustrating a system chip according to an embodiment of the present application.

FIG. 17 is a schematic structural diagram illustrating a system chip according to an embodiment of the present application. The system chip 1700 shown in FIG. 17 includes an input interface 1701, an output interface 1702, at least one processor 1703, and a memory 1704. The input interface 1701, the output interface 1702, the processor 1703, and the memory 1704 communicate with each other via an internal connection path. The processor 1703 is configured to execute codes in the memory 1704.

In an embodiment, when the codes are executed, the processor 1703 may implement the method 400 performed by the first terminal device in the method embodiment. For the sake of brevity, details will not be described herein again.

In an embodiment, when the codes are executed, the processor 1703 may implement the method 900 performed by the third terminal device in the method embodiment. For the sake of brevity, details will not be described herein again.

In an embodiment, when the codes are executed, the processor 1703 may implement the method 1000 performed by the network device in the method embodiment. For the sake of brevity, details will not be described herein again.

It may be known to persons of ordinary skill in the art that, the units and the algorithm steps of each example that are described with reference to the embodiments disclosed herein can be implemented by electronic hardware or a combination of computer software and electronic hardware. The situation whether these functions are performed by hardware or software depends on specific applications and design constraints of the technical solutions. Persons skilled in the art may implement the described functions by using different methods for each specific application, but such implementation should not be regarded as going beyond the scope of the present application.

It may be clearly understood by a person skilled in the art that, for the purpose of convenient and brief description, reference may be made to the corresponding processes in the foregoing method embodiments for detailed working processes of the foregoing systems, devices, and units, and details will not be described herein again.

In several embodiments provided in the present application, it should be understood that the disclosed systems, devices, and methods may be implemented in other manners. For example, the described device embodiments are merely exemplary. For instance, the division of the units is merely a division of logical functions and there may be other divisions during actual implementations. For instance, a plurality of units or components may be combined or integrated into another system, or some features may be omitted or not performed. In addition, the presented or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts shown as units may or may not be physical units, that is, may be located in one position, or may be distributed on a plurality of network units. A part or all of the units may be selected according to actual needs to achieve the objectives of the schemes of the present embodiments.

In addition, each of functional units in the each of embodiments of the present application may be integrated into one detecting unit, or each of the units may exist alone physically, or two or more units are integrated into one unit.

If implemented in a form of a software functional unit and sold or used as an independent product, the functions may be stored in a computer-readable storage medium. Based on such understanding, the technical solutions of the present application essentially, or the pan contributing to the prior art, or a part of the technical solutions may be implemented in a form of a software product. The computer software product is stored in a storage medium, and includes several instructions for enabling a computer device (which may be a personal computer, a server, or a network device, etc.) to perform all or a part of the steps of the methods described in each of the embodiments of the present application. The foregoing storage medium includes: any medium that can store program codes, such as a USB flash disk, a mobile hard disk, a Read-Only Memory (ROM), a Random Access Memory (RAM), a magnetic disk, or an optical disc, etc.

The above descriptions are merely specific embodiments of the present application; however, the protection scope of the present application is not limited thereto. Any modification or replacement that may be readily conceived by persons skilled in the art within the technical scope disclosed in the embodiments of the present application should fall into the protection scope of the present application. Therefore, the protection scope of the embodiments of the present application shall be subject to the claims.

What is claimed is:

1. A method for device-to-device (D2D) communication, comprising:
   determining, by a first terminal device, first control channel resources from pre-configured resources pool available for transmission of first resources scheduling information, and determining second control channel resources from pre-configured resources pool available for transmission of second resources scheduling information, wherein the first control channel resources have a time domain length longer than that of the second control channel resources; and
   transmitting, by the first terminal device, the first resources scheduling information on the first control channel resources, and transmitting the second resources scheduling information on the second control channel resources;
   wherein the first resources scheduling information is used by a second terminal device to determine data channel resources available for the first terminal device to transmit data channels, and the second resources scheduling information is used by a third terminal device to determine the data channel resources; the second terminal device is capable of detecting resources scheduling information based on the time domain length of the first control channel resources, and the third terminal device is capable of detecting resources scheduling information based on the time domain length of the first control channel resources and/or the time domain length of the second control channel resources;
   wherein the second control channel resources are located between the first control channel resources and the data channel resources in a frequency domain; or
   the data channels are located between the first control channel resources and the second control channel resources in a frequency domain; or
   the first control channel resources are located between the second control channel resources and the data channel resources in a frequency domain;
   wherein the data channel resources are adjacent or non-adjacent to the first control channel resources in a frequency domain, the data channel resources are adjacent or non-adjacent to the second control channel resources in a frequency domain, and the first control channel resources are adjacent or non-adjacent to the second control channel resources in a frequency domain.

2. The method according to claim 1, wherein the resources pool available for transmission of the second resources scheduling information comprises frequency domain resources of a preset size at an end of each of a plurality of sub-bands.

3. The method according to claim 2, wherein:
   if frequency domain resources of the preset size at an end of a first sub-band in which the data channel resources are located are not occupied by the data channels, the second control channel resources occupy the frequency domain resources of the preset size at the end of the first sub-band;
   if the frequency domain resources of the preset size at the end of the first sub-band are at least partially occupied by the data channels, the second control channel resources occupy frequency domain resources of the preset size at an end of a second sub-band, wherein the second sub-band is a next sub-band which is adjacent to the first sub-band and not occupied by the data channels.

4. The method according to claim 2, wherein the resources pool available for transmission of the first resources scheduling information comprises frequency domain resources of a preset size at a start of each of the sub-bands, wherein the first control channel resources are adjacent to the data channel resources in a frequency domain.

5. A terminal device which is a first terminal device, wherein the first terminal device comprises a processor, a transceiver, and a memory, and the memory is configured to store an instruction, and the processor is configured to execute the instruction stored in the memory to:
  determine first control channel resources from pre-configured resources pool available for transmission of first resources scheduling information, and determine second control channel resources from the pre-configured resources pool available for transmission of second resources scheduling information, wherein the first control channel resources have a time domain length longer than that of the second control channel resources; and
  control the transceiver to transmit the first resources scheduling information on the first control channel resources, and transmit the second resources scheduling information on the second control channel resources;
  wherein the first resources scheduling information is used by a second terminal device to determine data channel resources available for the first terminal device to transmit data channels, and the second resources scheduling information is used by a third terminal device to determine the data channel resources; the second terminal device is capable of detecting resources scheduling information based on the time domain length of the first control channel resources, and the third terminal device is capable of detecting resources scheduling information based on the time domain length of the first control channel resources and/or the time domain length of the second control channel resources;
  wherein the second control channel resources are located between the first control channel resources and the data channel resources in a frequency domain; or
  the data channels are located between the first control channel resources and the second control channel resources in a frequency domain; or
  the first control channel resources are located between the second control channel resources and the data channel resources in a frequency domain;
  wherein the data channel resources are adjacent or non-adjacent to the first control channel resources in a frequency domain, the data channel resources are adjacent or non-adjacent to the second control channel resources in a frequency domain, and the first control channel resources are adjacent or non-adjacent to the second control channel resources in a frequency domain.

6. The terminal device according to claim 5, wherein the processor is further configured to execute the instruction stored in the memory to control the transceiver to:
  receive indication information transmitted by a network device, wherein the indication information is used to indicate a position of a start resources block in the resources pool available for transmission of the second resources scheduling information.

7. The terminal device according to claim 5, wherein the resources pool available for transmission of the second resources scheduling information is configured by network device or agreed in protocol, and the resources pool available for transmission of the first resources scheduling information is configured by network device or agreed in protocol.

8. The terminal device according to claim 5, wherein the second control channel resources are aligned with a time domain start position of the data channel resources, and/or the second control channel resources are aligned with a time domain end position of the data channel resources.

9. The terminal device according to claim 5, wherein the second terminal device supports a communication protocol of Release-14 and does not support a communication protocol of Release-15, while the first terminal device and the third terminal device support a communication protocol of Release-15.

10. A terminal device which is a third terminal device, wherein the third terminal device comprises a processor, a transceiver, and a memory, and the memory is configured to store an instruction, and the processor is configured to execute the instruction stored in the memory to:
  detect second resources scheduling information transmitted by a first terminal device from pre-configured resources pool available for transmission of the second resources scheduling information, wherein the second resources scheduling information occupies second control channel resources, and where the second control channel resources have a time domain length shorter than that of first control channel resources, and the first control channel resources are used by the first terminal device to transmit first resources scheduling information; and
  determine, according to the second resources scheduling information, data channel resources available for the first terminal device to transmit data channels;
  wherein the first resources scheduling information is used by a second terminal device to determine the data channel resources; the second terminal device is capable of detecting resources scheduling information based on the time domain length of the first control channel resources, and the third terminal device is capable of detecting resources scheduling information based on the time domain length of the first control channel resources and/or the time domain length of the second control channel resources;
  wherein the second control channel resources are located between the first control channel resources and the data channel resources in a frequency domain; or
  the data channels are located between the first control channel resources and the second control channel resources in a frequency domain; or
  the first control channel resources are located between the second control channel resources and the data channel resources in a frequency domain;
  wherein the data channel resources are adjacent or non-adjacent to the first control channel resources in a frequency domain, the data channel resources are adjacent or non-adjacent to the second control channel resources in a frequency domain, and the first control channel resources are adjacent or non-adjacent to the second control channel resources in a frequency domain.

11. The terminal device according to claim 10, wherein the processor is further configured to execute the instruction stored in the memory to control the transceiver to:
  receive indication information transmitted by a network device, wherein the indication information is used to indicate a position of a start resources block in the resources pool available for transmission of the second resources scheduling information.

12. The terminal device according to claim 10, wherein the resources pool available for transmission of the second resources scheduling information comprises frequency domain resources of a preset size at an end of each of a plurality of sub-bands.

13. The terminal device according to claim 12, wherein:
if frequency domain resources of the preset size at an end of a first sub-band in which the data channel resources are located are not occupied by the data channels, the second control channel resources occupy the frequency domain resources of the preset size at the end of the first sub-band;
if the frequency domain resources of the preset size at the end of the first sub-band are at least partially occupied by the data channels, the second control channel resources occupy frequency domain resources of the preset size at an end of a second sub-band, wherein the second sub-band is a next sub-band which is adjacent to the first sub-band and not occupied by the data channels.

14. The terminal device according to claim 12, wherein the resources pool available for transmission of the first resources scheduling information comprises frequency domain resources of a preset size at a start of each of the sub-bands, wherein the first control channel resources are adjacent to the data channel resources in a frequency domain.

15. The terminal device according to claim 10, wherein the resources pool available for transmission of the second resources scheduling information is configured by network device or agreed in protocol, and the resources pool available for transmission of the first resources scheduling information is configured by network device or agreed in protocol.

16. The terminal device according to claim 10, wherein the second control channel resources are aligned with a time domain start position of the data channel resources, and/or the second control channel resources are aligned with a time domain end position of the data channel resources.

* * * * *